United States Patent
Carter et al.

(10) Patent No.: US 11,157,458 B1
(45) Date of Patent: Oct. 26, 2021

(54) REPLICATING FILES IN DISTRIBUTED FILE SYSTEMS USING OBJECT-BASED DATA STORAGE

(71) Applicant: Qumulo, Inc., Seattle, WA (US)

(72) Inventors: Nicholas John Carter, Seattle, WA (US); Sasha Spielberg Friedrich, Seattle, WA (US); Christopher Charles Harward, Vancouver (CA); Kevin David Jamieson, North Vancouver (CA); Aleksei Martynov, Seattle, WA (US); Sihang Su, Vancouver (CA)

(73) Assignee: Qumulo, Inc., Seattle, WA (US)

( * ) Notice: Subject to any disclaimer, the term of this patent is extended or adjusted under 35 U.S.C. 154(b) by 0 days.

(21) Appl. No.: 17/160,698

(22) Filed: Jan. 28, 2021

(51) Int. Cl.
| | |
|---|---|
| *G06F 17/00* | (2019.01) |
| *G06F 7/00* | (2006.01) |
| *G06F 16/178* | (2019.01) |
| *G06F 16/11* | (2019.01) |
| *G06F 16/182* | (2019.01) |
| *G06F 16/185* | (2019.01) |

(52) U.S. Cl.
CPC ......... *G06F 16/178* (2019.01); *G06F 16/128* (2019.01); *G06F 16/184* (2019.01); *G06F 16/185* (2019.01)

(58) Field of Classification Search
CPC .... G06F 16/178; G06F 16/184; G06F 16/128; G06F 16/185
USPC ........................................................ 707/620
See application file for complete search history.

(56) References Cited

U.S. PATENT DOCUMENTS

| 5,165,031 A | 11/1992 | Pruul et al. |
| 5,319,773 A | 6/1994 | Britton et al. |
| 5,410,684 A | 4/1995 | Ainsworth et al. |

(Continued)

FOREIGN PATENT DOCUMENTS

| EP | 1217551 A2 | 6/2002 |
| EP | 1498829 A1 | 1/2005 |

(Continued)

OTHER PUBLICATIONS

Office Communication for U.S. Appl. No. 16/226,587 dated Aug. 5, 2019, pp 1-46.

(Continued)

*Primary Examiner* — Pavan Mamillapalli
(74) *Attorney, Agent, or Firm* — John W. Branch; Branch Partners PLLC

(57) ABSTRACT

Embodiments are directed to traversing a file system to determine file system objects to copy to an object store. In response to visiting a document object in the file system, performing further actions, including: determining a hierarchical file path of the document object that corresponds to a location in the file system based on the file system objects that are ancestor file system objects of the document object; generating an object key for the document object that encodes the hierarchical file path such that each portion of the object key corresponds to an ancestor file system object; copying the document object and the object key to the object store such that the document object may be stored in the object store as an object store object and such that the object store object may be indexed using an unordered index based on the object key; or the like.

26 Claims, 10 Drawing Sheets

(56) References Cited

U.S. PATENT DOCUMENTS

| | | |
|---|---|---|
| 5,410,719 A | 4/1995 | Shackleford |
| 5,442,561 A | 8/1995 | Yoshizawa et al. |
| 5,953,719 A | 9/1999 | Kleewein et al. |
| 6,236,996 B1 | 5/2001 | Bapat et al. |
| 6,385,641 B1 | 5/2002 | Jiang et al. |
| 6,415,283 B1 | 7/2002 | Conklin |
| 6,496,944 B1 | 12/2002 | Hsiao et al. |
| 6,529,998 B1 | 3/2003 | Yochai et al. |
| 6,560,615 B1 | 5/2003 | Zayas et al. |
| 6,772,435 B1 | 8/2004 | Thexton et al. |
| 6,874,130 B1 | 3/2005 | Baweja et al. |
| 6,892,211 B2 | 5/2005 | Hitz et al. |
| 6,965,903 B1 | 11/2005 | Agarwal et al. |
| 6,965,936 B1 | 11/2005 | Wipfel et al. |
| 7,213,040 B1 | 5/2007 | Stokes et al. |
| 7,594,138 B2 | 9/2009 | Abdulvahid |
| 7,636,743 B2 | 12/2009 | Erofeev |
| 7,693,876 B2 | 4/2010 | Hackworth et al. |
| 7,757,056 B1 | 7/2010 | Fair |
| 7,844,580 B2 | 11/2010 | Srivastava et al. |
| 7,933,870 B1 | 4/2011 | Webster |
| 7,937,421 B2 | 5/2011 | Mikesell et al. |
| 7,962,709 B2 | 6/2011 | Agrawal |
| 7,966,293 B1 | 6/2011 | Owara et al. |
| 8,027,827 B2 | 9/2011 | Bitar et al. |
| 8,046,378 B1 | 10/2011 | Zhuge et al. |
| 8,108,429 B2 | 1/2012 | Sim-Tang et al. |
| 8,296,312 B1 | 10/2012 | Leung et al. |
| 8,355,407 B2 | 1/2013 | Wookey et al. |
| 8,364,648 B1 | 1/2013 | Sim-Tang |
| 8,423,733 B1 | 4/2013 | Ozdemir |
| 8,448,170 B2 | 5/2013 | Wipfel et al. |
| 8,463,825 B1 | 6/2013 | Harty et al. |
| 8,489,656 B2 | 7/2013 | Erofeev |
| 8,504,733 B1 | 8/2013 | Iyer et al. |
| 8,515,911 B1 | 8/2013 | Zhou et al. |
| 8,612,404 B2 | 12/2013 | Bone et al. |
| 8,612,488 B1 | 12/2013 | Subramanya et al. |
| 8,645,323 B2 | 2/2014 | Jackiewicz et al. |
| 8,661,447 B1 | 2/2014 | Olliff et al. |
| 8,776,050 B2 | 7/2014 | Plouffe et al. |
| 8,782,655 B2 | 7/2014 | Blanding et al. |
| 8,806,154 B1 | 8/2014 | Gupta et al. |
| 8,838,887 B1 | 9/2014 | Burke et al. |
| 8,838,931 B1 | 9/2014 | Marshak et al. |
| 8,849,764 B1 | 9/2014 | Long et al. |
| 8,868,797 B1 | 10/2014 | Kirac et al. |
| 8,924,364 B1 | 12/2014 | Zhong et al. |
| 8,972,694 B1 | 3/2015 | Dolan et al. |
| 9,015,214 B2 | 4/2015 | Nishida et al. |
| 9,026,765 B1 | 5/2015 | Marshak et al. |
| 9,047,017 B1 | 6/2015 | Dolan et al. |
| 9,141,633 B1 | 9/2015 | Li et al. |
| 9,143,379 B1 | 9/2015 | Berger et al. |
| 9,158,653 B2 | 10/2015 | Gold |
| 9,171,145 B2 | 10/2015 | Dash et al. |
| 9,244,975 B2 | 1/2016 | Das et al. |
| 9,244,976 B1 | 1/2016 | Zhang et al. |
| 9,384,252 B2 | 7/2016 | Akirav et al. |
| 9,501,487 B1 | 11/2016 | Yuan et al. |
| 9,547,560 B1 | 1/2017 | Lee |
| 9,600,193 B2 | 3/2017 | Ahrens et al. |
| 9,747,171 B2 | 8/2017 | Beeken et al. |
| 9,753,782 B2 | 9/2017 | Fang et al. |
| 9,753,932 B1 | 9/2017 | Brow et al. |
| 9,785,377 B2 | 10/2017 | Shin et al. |
| 10,140,185 B1 | 11/2018 | Lopez et al. |
| 10,261,868 B2 | 4/2019 | Brown et al. |
| 10,275,493 B1 | 4/2019 | Mostak |
| 10,303,561 B2 | 5/2019 | Beeken et al. |
| 10,318,401 B2 | 6/2019 | Rothschilds et al. |
| 10,339,101 B1 | 7/2019 | Gupta |
| 10,423,609 B1 | 9/2019 | Strauss |
| 10,437,509 B1 | 10/2019 | Alexeev et al. |
| 10,447,779 B2 * | 10/2019 | Dieterich ............ H04L 67/1095 |
| 10,474,635 B1 | 11/2019 | Unger et al. |
| 10,534,758 B1 | 1/2020 | Carpenter et al. |
| 10,678,663 B1 | 6/2020 | Sharma et al. |
| 2001/0039622 A1 | 11/2001 | Hitz et al. |
| 2002/0065835 A1 | 5/2002 | Fujisaki |
| 2002/0083073 A1 | 6/2002 | Vaidya et al. |
| 2002/0099691 A1 | 7/2002 | Lore et al. |
| 2002/0178271 A1 | 11/2002 | Graham et al. |
| 2003/0033308 A1 | 2/2003 | Patel et al. |
| 2003/0145009 A1 | 7/2003 | Forman et al. |
| 2003/0177379 A1 | 9/2003 | Hori et al. |
| 2003/0182313 A1 | 9/2003 | Federwisch et al. |
| 2004/0030727 A1 | 2/2004 | Armangau et al. |
| 2004/0098425 A1 | 5/2004 | Wiss et al. |
| 2004/0153479 A1 | 8/2004 | Mikesell et al. |
| 2004/0255048 A1 | 12/2004 | Lev Ran et al. |
| 2005/0015674 A1 | 1/2005 | Haugh |
| 2005/0027748 A1 | 2/2005 | Kisley |
| 2005/0065986 A1 | 3/2005 | Bixby et al. |
| 2005/0091663 A1 | 4/2005 | Bagsby |
| 2005/0114726 A1 | 5/2005 | Ouchi |
| 2005/0119996 A1 | 6/2005 | Ohata et al. |
| 2005/0154866 A1 | 7/2005 | Steely, Jr. et al. |
| 2005/0195660 A1 | 9/2005 | Kavuri et al. |
| 2005/0223019 A1 | 10/2005 | Das et al. |
| 2006/0004890 A1 | 1/2006 | Semple et al. |
| 2006/0053139 A1 | 3/2006 | Marzinski et al. |
| 2006/0089982 A1 | 4/2006 | Abbott et al. |
| 2006/0090036 A1 | 4/2006 | Zohar et al. |
| 2006/0123005 A1 | 6/2006 | Burnett et al. |
| 2006/0173842 A1 | 8/2006 | Horvitz et al. |
| 2006/0271604 A1 | 11/2006 | Shoens |
| 2007/0011302 A1 | 1/2007 | Groner et al. |
| 2007/0027985 A1 | 2/2007 | Ramany et al. |
| 2007/0100855 A1 | 5/2007 | T. Kohl |
| 2007/0118561 A1 | 5/2007 | Idicula et al. |
| 2007/0143371 A1 | 6/2007 | Kottomtharayil |
| 2008/0028006 A1 | 1/2008 | Liu et al. |
| 2008/0059399 A1 | 3/2008 | DeLorme et al. |
| 2008/0059541 A1 | 3/2008 | Fachan et al. |
| 2008/0082593 A1 | 4/2008 | Komarov et al. |
| 2008/0172366 A1 | 7/2008 | Hannel et al. |
| 2008/0228772 A1 | 9/2008 | Plamondon |
| 2008/0250357 A1 | 10/2008 | Lee et al. |
| 2008/0256474 A1 | 10/2008 | Chakra et al. |
| 2008/0270469 A1 | 10/2008 | Myerson et al. |
| 2008/0270928 A1 | 10/2008 | Chakra et al. |
| 2008/0282244 A1 | 11/2008 | Wu et al. |
| 2008/0288306 A1 | 11/2008 | MacIntyre et al. |
| 2008/0301256 A1 | 12/2008 | McWilliams et al. |
| 2008/0313217 A1 | 12/2008 | Dunsmore et al. |
| 2009/0077087 A1 | 3/2009 | Urano et al. |
| 2009/0138500 A1 | 5/2009 | Yuan et al. |
| 2009/0199190 A1 | 8/2009 | Chen et al. |
| 2009/0222509 A1 | 9/2009 | King et al. |
| 2009/0240539 A1 | 9/2009 | Slawson et al. |
| 2009/0274047 A1 | 11/2009 | Kruys et al. |
| 2009/0319566 A1 | 12/2009 | Wald et al. |
| 2010/0030825 A1 * | 2/2010 | Matsuzawa ............ G06F 16/162 |
| | | 707/E17.01 |
| 2010/0036895 A1 | 2/2010 | Boyd et al. |
| 2010/0088317 A1 | 4/2010 | Bone et al. |
| 2010/0161557 A1 | 6/2010 | Anderson et al. |
| 2010/0179959 A1 | 7/2010 | Shoens |
| 2010/0217948 A1 | 8/2010 | Mason et al. |
| 2010/0241668 A1 | 9/2010 | Susanto et al. |
| 2010/0281214 A1 | 11/2010 | Jernigan, IV |
| 2010/0287512 A1 | 11/2010 | Gan et al. |
| 2011/0039622 A1 | 2/2011 | Levenson |
| 2011/0066668 A1 | 3/2011 | Guarraci |
| 2011/0082836 A1 * | 4/2011 | Wang .................... G06F 16/166 |
| | | 707/649 |
| 2011/0125799 A1 | 5/2011 | Kandasamy et al. |
| 2011/0125973 A1 | 5/2011 | Lev et al. |
| 2011/0161381 A1 | 6/2011 | Wang et al. |
| 2011/0161964 A1 | 6/2011 | Piazza et al. |
| 2011/0196833 A1 | 8/2011 | Drobychev et al. |
| 2011/0196899 A1 | 8/2011 | Hughes et al. |
| 2011/0202925 A1 | 8/2011 | Banerjee et al. |

(56) References Cited

U.S. PATENT DOCUMENTS

| | | |
|---|---|---|
| 2011/0246724 A1 | 10/2011 | Marathe et al. |
| 2012/0036463 A1 | 2/2012 | Krakovsky et al. |
| 2012/0066179 A1 | 3/2012 | Saika |
| 2012/0096059 A1 | 4/2012 | Shimizu et al. |
| 2012/0136843 A1 | 5/2012 | Bone et al. |
| 2012/0151438 A1 | 6/2012 | Bach et al. |
| 2012/0166478 A1 | 6/2012 | Das et al. |
| 2012/0204060 A1 | 8/2012 | Swift et al. |
| 2012/0317079 A1 | 12/2012 | Shoens et al. |
| 2013/0019072 A1 | 1/2013 | Strasser et al. |
| 2013/0024609 A1 | 1/2013 | Gorobets et al. |
| 2013/0073819 A1 | 3/2013 | Havewala et al. |
| 2013/0086121 A1 | 4/2013 | Presian |
| 2013/0091168 A1 | 4/2013 | Bhave et al. |
| 2013/0110787 A1 | 5/2013 | Garimella et al. |
| 2013/0191355 A1 * | 7/2013 | Bone et al. |
| 2013/0212579 A1 * | 8/2013 | Ben-Shaul .............. G06F 9/451 718/1 |
| 2013/0227236 A1 | 8/2013 | Flynn et al. |
| 2013/0304903 A1 | 11/2013 | Mick et al. |
| 2013/0311454 A1 | 11/2013 | Ezzat |
| 2013/0318194 A1 | 11/2013 | Timbs |
| 2013/0325806 A1 | 12/2013 | Bachar et al. |
| 2013/0339406 A1 | 12/2013 | Kanfi |
| 2014/0006354 A1 | 1/2014 | Parkinson et al. |
| 2014/0040199 A1 | 2/2014 | Golab et al. |
| 2014/0040693 A1 | 2/2014 | Kim et al. |
| 2014/0095249 A1 | 4/2014 | Tarakad et al. |
| 2014/0101389 A1 | 4/2014 | Nellans et al. |
| 2014/0156956 A1 | 6/2014 | Ezra |
| 2014/0181441 A1 | 6/2014 | Kottomtharayil et al. |
| 2014/0237193 A1 | 8/2014 | Shivashankaraiah |
| 2014/0258609 A1 | 9/2014 | Cui et al. |
| 2014/0280485 A1 | 9/2014 | A Hummaida et al. |
| 2014/0281307 A1 | 9/2014 | Peterson et al. |
| 2014/0281411 A1 | 9/2014 | Abdallah |
| 2014/0344222 A1 | 11/2014 | Morris et al. |
| 2014/0372384 A1 | 12/2014 | Long et al. |
| 2014/0372607 A1 | 12/2014 | Gladwin et al. |
| 2014/0373032 A1 | 12/2014 | Merry et al. |
| 2015/0006226 A1 | 1/2015 | Smith et al. |
| 2015/0067086 A1 | 3/2015 | Adriaens et al. |
| 2015/0067142 A1 | 3/2015 | Renkema |
| 2015/0106145 A1 | 4/2015 | Hamilton et al. |
| 2015/0135331 A1 | 5/2015 | Das |
| 2015/0149736 A1 | 5/2015 | Kwon et al. |
| 2015/0186529 A1 | 7/2015 | Rope et al. |
| 2015/0193347 A1 | 7/2015 | Kluesing et al. |
| 2015/0215405 A1 | 7/2015 | Baek et al. |
| 2015/0234879 A1 | 8/2015 | Baldwin et al. |
| 2015/0242263 A1 | 8/2015 | Klose |
| 2015/0278282 A1 | 10/2015 | Sardina et al. |
| 2015/0310035 A1 | 10/2015 | Godman et al. |
| 2015/0347126 A1 | 12/2015 | Tibble et al. |
| 2016/0034356 A1 * | 2/2016 | Aron ................... G06F 11/1435 707/649 |
| 2016/0139836 A1 | 5/2016 | Nallathambi et al. |
| 2016/0147654 A1 | 5/2016 | Zhao et al. |
| 2016/0224430 A1 | 8/2016 | Long et al. |
| 2016/0246816 A1 | 8/2016 | Abiri et al. |
| 2016/0292013 A1 | 10/2016 | Li et al. |
| 2016/0306810 A1 | 10/2016 | Ni et al. |
| 2016/0314046 A1 | 10/2016 | Kumarasamy |
| 2016/0335278 A1 | 11/2016 | Tabaaloute et al. |
| 2016/0357677 A1 | 12/2016 | Hooker et al. |
| 2016/0359859 A1 | 12/2016 | Capone |
| 2016/0371297 A1 | 12/2016 | Okun et al. |
| 2016/0380878 A1 | 12/2016 | Bugenhagen et al. |
| 2017/0032006 A1 | 2/2017 | Anglin et al. |
| 2017/0046143 A1 | 2/2017 | Kochhar et al. |
| 2017/0052898 A1 | 2/2017 | Ash et al. |
| 2017/0078164 A1 | 3/2017 | Hildebrand et al. |
| 2017/0091046 A1 | 3/2017 | Bangalore et al. |
| 2017/0123883 A1 | 5/2017 | Hall |
| 2017/0123935 A1 | 5/2017 | Pandit et al. |
| 2017/0163728 A1 | 6/2017 | Chawla et al. |
| 2017/0201582 A1 | 7/2017 | Zhang et al. |
| 2017/0206231 A1 | 7/2017 | Binder et al. |
| 2017/0286455 A1 | 10/2017 | Li et al. |
| 2017/0316321 A1 | 11/2017 | Whitney et al. |
| 2017/0336983 A1 | 11/2017 | Roh et al. |
| 2017/0344598 A1 | 11/2017 | Constantinescu et al. |
| 2017/0344905 A1 | 11/2017 | Hack et al. |
| 2017/0366609 A1 * | 12/2017 | Dieterich ................ H04L 67/42 |
| 2018/0040029 A1 | 2/2018 | Zeng et al. |
| 2018/0101546 A1 | 4/2018 | Krasnow et al. |
| 2018/0129443 A1 | 5/2018 | Karve et al. |
| 2018/0288057 A1 | 10/2018 | Varadamma et al. |
| 2018/0314423 A1 | 11/2018 | Gong et al. |
| 2019/0095112 A1 | 3/2019 | Lingarajappa |
| 2019/0102700 A1 | 4/2019 | Babu et al. |
| 2019/0163591 A1 | 5/2019 | Ouyang et al. |
| 2019/0384640 A1 | 12/2019 | Swamy et al. |
| 2020/0004977 A1 | 1/2020 | Araujo et al. |
| 2020/0026438 A1 * | 1/2020 | Peleg ..................... G06F 12/10 |
| 2021/0042263 A1 | 2/2021 | Zdornov et al. |
| 2021/0042282 A1 | 2/2021 | Cseri et al. |

FOREIGN PATENT DOCUMENTS

| | | |
|---|---|---|
| WO | 1999044145 A1 | 9/1999 |
| WO | 0072201 A1 | 11/2000 |
| WO | 2009007250 A2 | 1/2009 |

OTHER PUBLICATIONS

Office Communication for U.S. Appl. No. 16/228,716 dated Jun. 24, 2019, pp. 1-10.
Office Communication for U.S. Appl. No. 16/231,354 dated Jul. 10, 2019, pp. 1-8.
Office Communication for U.S. Appl. No. 16/262,756 dated Aug. 5, 2019, pp. 1-35.
Office Communication for U.S. Appl. No. 15/967,499 dated Jun. 27, 2018, pp. 1-16.
Office Communication for U.S. Appl. No. 16/226,587 dated Feb. 25, 2019, pp. 1-43.
Office Communication for U.S. Appl. No. 16/228,716 dated Feb. 28, 2019, pp. 1-15.
Office Communication for U.S. Appl. No. 16/231,354 dated Mar. 25, 2019, pp. 1-10.
Office Communication for U.S. Appl. No. 16/262,756 dated Apr. 2, 2019, pp. 1-29.
Office Communication for U.S. Appl. No. 16/262,790 dated Aug. 23, 2019, pp. 1-16.
Office Communication for U.S. Appl. No. 16/262,790 dated Apr. 18, 2019, pp. 1-14.
Office Communication for U.S. Appl. No. 16/262,756 dated Oct. 25, 2019, pp. 1-4.
Office Communication for U.S. Appl. No. 16/659,488 dated Dec. 30, 2019, pp. 1-6.
Office Communication for U.S. Appl. No. 14/595,598 dated Dec. 31, 2019, pp. 1-16.
Office Communication for U.S. Appl. No. 16/004,208 dated Aug. 27, 2018, pp. 1-11.
Office Communication for U.S. Appl. No. 16/234,395 dated Aug. 8, 2019, pp. 1-10.
Office Communication for U.S. Appl. No. 16/234,334 dated Apr. 5, 2019, pp. 1-15.
Office Communication for U.S. Appl. No. 16/234,395 dated Mar. 28, 2019, pp. 1-10.
Office Communication for U.S. Appl. No. 16/234,334 dated Oct. 11, 2019, pp. 1-16.
Office Communication for U.S. Appl. No. 15/473,051 dated Jun. 30, 2017, pp. 1-23.
Extended European Search Report for European Patent Application No. 18155779.4 dated Apr. 17, 2018, pp. 1-15.
Office Communication for U.S. Appl. No. 16/004,182 dated Aug. 23, 2018, pp. 1-43.

(56) References Cited

OTHER PUBLICATIONS

Office Communication for U.S. Appl. No. 16/004,182 dated Mar. 5, 2019, pp. 1-46.
Office Communication for U.S. Appl. No. 16/004,182 dated Jul. 3, 2019, pp. 1-45.
Office Communication for U.S. Appl. No. 15/694,604 dated Jun. 3, 2019, pp. 1-8.
Office Communication for U.S. Appl. No. 16/004,182 dated May 22, 2019, pp. 1-4.
Office Communication for U.S. Appl. No. 14/595,043 dated May 4, 2017, pp. 1-30.
Office Communication for U.S. Appl. No. 14/595,043 dated Feb. 23, 2018, pp. 1-16.
Office Communication for U.S. Appl. No. 14/595,043 dated May 25, 2018, pp. 1-7.
Office Communication for U.S. Appl. No. 14/595,043 dated Oct. 5, 2018, pp. 1-17.
Office Communication for U.S. Appl. No. 14/595,043 dated Jun. 7, 2019, pp. 1-19.
Office Communication for U.S. Appl. No. 14/595,043 dated Aug. 27, 2019, pp. 1-17.
Office Communication for U.S. Appl. No. 14/658,015 dated Apr. 27, 2017, pp. 1-7.
Office Communication for U.S. Appl. No. 14/658,015 dated Jan. 4, 2018, pp. 1-28.
Office Communication for U.S. Appl. No. 14/658,015 dated Jul. 13, 2018, pp. 1-8.
Office Communication for U.S. Appl. No. 14/859,061 dated Sep. 22, 2017, pp. 1-16.
Office Communication for U.S. Appl. No. 15/831,236 dated Mar. 30, 2018, pp. 1-8.
Office Communication for U.S. Appl. No. 15/831,236 dated Aug. 15, 2018, pp. 1-14.
Office Communication for U.S. Appl. No. 14/859,114 dated Jul. 24, 2017, pp. 1-41.
Office Communication for U.S. Appl. No. 14/859,114 dated Feb. 21, 2018, pp. 1-25.
Office Communication for U.S. Appl. No. 14/859,114 dated May 11, 2018, pp. 1-5.
Office Communication for U.S. Appl. No. 14/859,114 dated Jun. 27, 2018, pp. 1-33.
Office Communication for U.S. Appl. No. 14/859,114 dated Nov. 19, 2018, pp. 1-35.
Office Communication for U.S. Appl. No. 14/859,114 dated Jan. 31, 2019, pp. 1-4.
Office Communication for U.S. Appl. No. 14/859,114 dated Mar. 7, 2019, pp. 1-32.
Office Communication for U.S. Appl. No. 14/859,114 dated Jun. 26, 2019, pp. 1-21.
Office Communication for U.S. Appl. No. 14/859,114 dated Sep. 13, 2019, pp. 1-6.
Office Communication for U.S. Appl. No. 14/859,114 dated Nov. 26, 2019, pp. 1-21.
Office Communication for U.S. Appl. No. 15/288,853 dated Sep. 19, 2018, pp. 1-13.
Office Communication for U.S. Appl. No. 15/288,853 dated Mar. 25, 2019, pp. 1-10.
Office Communication for U.S. Appl. No. 16/436,825 dated Jul. 11, 2019, pp. 1-9.
Office Communication for U.S. Appl. No. 15/474,047 dated Sep. 18, 2017, pp. 1-14.
Office Communication for U.S. Appl. No. 15/474,047 dated Mar. 9, 2018, pp. 1-8.
Office Communication for U.S. Appl. No. 15/474,047 dated Jun. 11, 2018, pp. 1-6.
Office Communication for U.S. Appl. No. 15/474,047 dated Aug. 15, 2018, pp. 1-11.
Office Communication for U.S. Appl. No. 15/957,809 dated Jun. 28, 2018, pp. 1-27.
Office Communication for U.S. Appl. No. 15/957,809 dated Jan. 24, 2019, pp. 1-11.
Office Communication for U.S. Appl. No. 16/434,157 dated Jul. 25, 2019, pp. 1-8.
Office Communication for U.S. Appl. No. 15/854,447 dated May 6, 2019, pp. 1-9.
Office Communication for U.S. Appl. No. 16/505,562 dated Aug. 30, 2019, pp. 1-11.
Extended European Search Report for European Patent Application No. 17206518.7 dated Apr. 5, 2018, pp. 1-8.
Office Communication for U.S. Appl. No. 16/004,182 dated Jan. 7, 2020, pp. 1-46.
Office Communication for U.S. Appl. No. 16/125,573 dated Nov. 21, 2019, pp. 1-13.
Office Communication for U.S. Appl. No. 16/226,587 dated Oct. 24, 2019, pp. 1-4.
Office Communication for U.S. Appl. No. 16/262,790 dated Dec. 12, 2019, pp. 1-10.
Office Communication for U.S. Appl. No. 16/234,334 dated Jan. 16, 2020, pp. 1-8.
Office Communication for U.S. Appl. No. 15/694,604 dated Nov. 20, 2019, pp. 1-8.
Office Communication for U.S. Appl. No. 16/262,756 dated Jan. 28, 2020, pp. 1-21.
Office Communication for U.S. Appl. No. 16/434,157 dated Jan. 29, 2020, pp. 1-9.
Office Communication for U.S. Appl. No. 16/262,790 dated Feb. 6, 2020, pp. 1-8.
Office Communication for U.S. Appl. No. 14/859,114 dated Mar. 13, 2020, pp. 1-21.
Office Communication for U.S. Appl. No. 16/752,451 dated Mar. 12, 2020, pp. 1-14.
Office Communication for U.S. Appl. No. 16/775,041 dated Mar. 11, 2020, pp. 1-8.
Office Communication for U.S. Appl. No. 16/779,362 dated Mar. 26, 2020, pp. 1-10.
Office Communication for U.S. Appl. No. 16/004,182 dated Mar. 23, 2020, pp. 1-4.
Office Communication for U.S. Appl. No. 16/752,509 dated Apr. 2, 2020, pp. 1-8.
Office Communication for U.S. Appl. No. 16/152,277 dated Apr. 3, 2020, pp. 1-10.
Office Communication for U.S. Appl. No. 16/004,182 dated Apr. 28, 2020, pp. 1-51.
Office Communication for U.S. Appl. No. 16/152,259 dated Apr. 29, 2020, pp. 1-19.
Office Communication for U.S. Appl. No. 14/859,114 dated Jun. 5, 2020, pp. 1-5.
Office Communication for U.S. Appl. No. 16/262,756 dated Jun. 8, 2020, pp. 1-22.
Office Communication for U.S. Appl. No. 14/595,598 dated Jul. 9, 2020, pp. 1-19.
Office Communication for U.S. Appl. No. 16/752,451 dated Jul. 23, 2020, pp. 1-8.
Office Communication for U.S. Appl. No. 14/859,114 dated Jul. 23, 2020, pp. 1-21.
Office Communication for U.S. Appl. No. 16/152,615 dated Aug. 6, 2020, pp. 1-7.
Office Communication for U.S. Appl. No. 16/779,362 dated Aug. 7, 2020, pp. 1-11.
Office Communication for U.S. Appl. No. 16/883,922 dated Aug. 7, 2020, pp. 1-13.
Office Communication for U.S. Appl. No. 16/775,041 dated Aug. 18, 2020, pp. 1-9.
Office Communication for U.S. Appl. No. 16/883,879 dated Sep. 1, 2020, pp. 1-11.
Extended European Search Report for European Patent Application No. 16812585.4 dated Nov. 7, 2018, pp. 1-9.
Office Communication for European Patent Application No. 16812585.4 dated Jan. 2, 2020, pp. 1-6.
International Search Report and Written Opinion for International Patent Application No. PCT/US2016/038242 dated Oct. 11, 2016, pp. 1-11.

(56) References Cited

OTHER PUBLICATIONS

Office Communication for U.S. Appl. No. 14/595,598 dated Jul. 31, 2019, pp. 1-5.
Office Communication for U.S. Appl. No. 14/595,598 dated Sep. 20, 2018, pp. 1-18.
Office Communication for U.S. Appl. No. 14/595,598 dated Dec. 15, 2017, pp. 1-18.
Office Communication for U.S. Appl. No. 14/595,598 dated Feb. 24, 2017, pp. 1-8.
Office Communication for U.S. Appl. No. 14/595,598 dated Apr. 19, 2018, pp. 1-5.
Office Communication for U.S. Appl. No. 16/262,756 dated Aug. 24, 2020, pp. 1-7.
Office Communication for European Patent Application No. 18155779.4 dated Oct. 8, 2019, pp. 1-4.
Office Communication for U.S. Appl. No. 16/152,259 dated Aug. 28, 2020, pp. 1-5.
Office Communication for U.S. Appl. No. 16/752,509 dated Aug. 11, 2020, pp. 1-7.
Office Communication for U.S. Appl. No. 14/595,598 dated Sep. 25, 2020, pp. 1-7.
Office Communication for U.S. Appl. No. 16/152,277 dated Oct. 16, 2020, pp. 1-10.
Office Communication for U.S. Appl. No. 16/152,615 dated Oct. 20, 2020, pp. 1-7.
Office Communication for U.S. Appl. No. 16/775,041 dated Nov. 3, 2020, pp. 1-5.
Office Communication for U.S. Appl. No. 17/062,500 dated Nov. 12, 2020, pp. 1-12.
Office Communication for U.S. Appl. No. 16/004,182 dated Nov. 30, 2020, pp. 1-55.
Office Communication for U.S. Appl. No. 14/859,114 dated Dec. 1, 2020, pp. 1-24.
Office Communication for U.S. Appl. No. 16/883,922 dated Dec. 2, 2020, pp. 1-9.
Office Communication for U.S. Appl. No. 16/883,879 dated Dec. 8, 2020, pp. 1-5.
Office Communication for U.S. Appl. No. 16/152,277 dated Dec. 28, 2020, pp. 1-5.
Office Communication for U.S. Appl. No. 16/004,182 dated Jan. 28, 2021, pp. 1-4.
Kappes, Giorgos et al., "Dike: Virtualization-aware Access Control for Multitenant Filesystems", Feb. 18, 2013, pp. 1-6.
Hitz, Dave et al., "Merging NT and UNIX filesystem Permissions", Proceedings of the 2nd USENIX Windows NT Symposium, Seattle, Washington, Aug. 3-4, 1998, pp. 1-10.
Chimera, Richard, "Value Bars: An Information Visualization and Navigation Tool for Multi-attribute Listings", CHI '92, Monterey, CA, May 3-7, 1992, pp. 293-294.
Cudre-Mauroux, Philippe et al., "TrajStore: An Adaptive Storage System for Very Large Trajectory Sets", ICDE 2010, Long Beach, CA, Mar. 1-6, 2010, pp. 109-120.
Karatza et al., "Epoch Load Sharing in a Network of Workstations," Simulation Symposium, 2001. Proceedings. 34th Annual Apr. 22-26, 2001, Piscataway, NJ, USA, IEEE, XP010541274, ISBN: 978-0-7695-1092-7, pp. 36-42.
Wikipedia clustered file system page from date Jul. 9, 2019, retrieved using the WayBackMachine, From https://web.archive.org/web/20190709083400/https://en.wikipedia.org/wiki/Clustered_file_system (Year: 2019), pp. 1-6.
Wikipedia raft page from date Jul. 16, 2019, retrieved using the WayBackMachine, from https://web.archive.org/web/20190716115001/https://en.wikipedia.org/wiki/Raft (computer_science) (Year: 2019), pp. 1-4.
Comer, Douglas, "The Ubiquitous B-Tree," Computing Surveys, vol. 11, No. 2, Jun. 1979, Computer Science Department, Purdue University, West Lafayette, Indiana 47907, pp. 121-137.
Bloom, Burton H., "Space/Time Trade-offs in Hash Coding with Allowable Errors," Communications of the ACM, vol. 13, No. 7, Jul. 1970. Computer Usage Company, Newton Upper Falls, Massachusetts, pp. 422-426.
Office Communication for U.S. Appl. No. 14/595,598 dated Feb. 4, 2021, pp. 1-19.
Office Communication for U.S. Appl. No. 17/115,529 dated Feb. 8, 2021, pp. 1-15.
Office Communication for U.S. Appl. No. 16/262,756 dated Feb. 10, 2021, pp. 1-19.
Office Communication for U.S. Appl. No. 17/114,384 dated Feb. 17, 2021, pp. 1-12.
Examination Report for European Patent Application No. 17206518.7 dated Feb. 23, 2021, pp. 1-6.
Office Communication for U.S. Appl. No. 14/859,114 dated Mar. 8, 2021, pp. 1-4.
Office Communication for U.S. Appl. No. 16/004,182 dated Mar. 8, 2021, pp. 1-60.
Office Communication for U.S. Appl. No. 17/062,500 dated Mar. 9, 2021, pp. 1-17.
Office Communication for U.S. Appl. No. 16/152,277 dated Mar. 18, 2021, pp. 1-10.
Office Communication for U.S. Appl. No. 17/062,500 dated May 18, 2021, pp. 1-4.
Office Communication for U.S. Appl. No. 17/203,371 dated May 20, 2021, pp. 1-10.
Office Communication for U.S. Appl. No. 17/115,529 dated May 25, 2021, pp. 1-18.
Office Communication for U.S. Appl. No. 14/859,114 dated May 26, 2021, pp. 1-11.
Office Communication for U.S. Appl. No. 16/262,756 dated May 27, 2021, pp. 1-7.
Office Communication for U.S. Appl. No. 17/114,384 dated May 27, 2021, pp. 1-13.
Office Communication for U.S. Appl. No. 17/190,653 dated May 27, 2021, pp. 1-11.
Office Communication for U.S. Appl. No. 16/741,567 dated Jun. 8, 2021, pp. 1-5.

* cited by examiner

REPLICATING FILES IN DISTRIBUTED FILE SYSTEMS USING OBJECT-BASED DATA STORAGE

TECHNICAL FIELD

The present invention relates generally to file systems, and more particularly, but not exclusively, to managing replicating files into object stores.

BACKGROUND

Modern computing often requires the collection, processing, or storage of very large data sets or file systems. Accordingly, to accommodate the capacity requirements as well as other requirements, such as, high availability, redundancy, latency/access considerations, or the like, modern file systems may be very large or distributed across multiple hosts, networks, or data centers, and so on. File systems may require various backup or restore operations. Naïve backup strategies may cause significant storage or performance overhead. For example, in some cases, the dataset size or distributed nature of modern hyper-scale file systems may make it difficult to determine the objects that need to be replicated. Also, the large number of files in modern distributed file systems may make managing file system state, data protection information, or the like, difficult because of the resources that may be required to visit the files to manage the state or data protection information of the files. Further, in some cases, files stored in file-based data stores may need to be replicated to other types of data stores that may employ different storage paradigms, such as object stores. Thus, it is with respect to these considerations and others that the present invention has been made.

BRIEF DESCRIPTION OF THE DRAWINGS

Non-limiting and non-exhaustive embodiments of the present innovations are described with reference to the following drawings. In the drawings, like reference numerals refer to like parts throughout the various figures unless otherwise specified. For a better understanding of the described innovations, reference will be made to the following Detailed Description of Various Embodiments, which is to be read in association with the accompanying drawings, wherein.

DETAILED DESCRIPTION OF VARIOUS EMBODIMENTS

Figure 1:
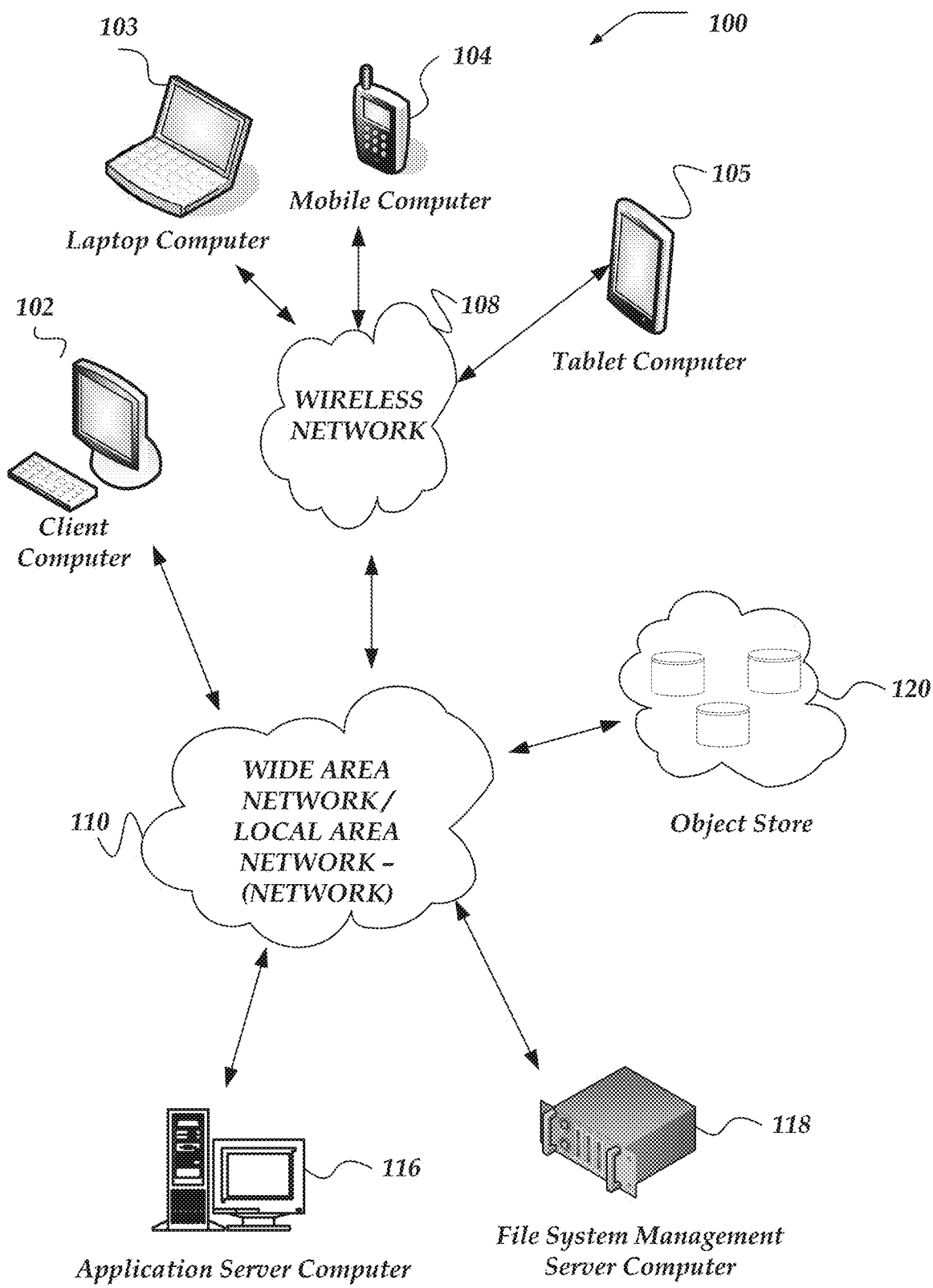
FIG. 1 illustrates a system environment in which various embodiments may be implemented.

Various embodiments now will be described more fully hereinafter with reference to the accompanying drawings, which form a part hereof, and which show, by way of illustration, specific exemplary embodiments by which the invention may be practiced. The embodiments may, however, be embodied in many different forms and should not be construed as limited to the embodiments set forth herein; rather, these embodiments are provided so that this disclosure will be thorough and complete, and will fully convey the scope of the embodiments to those skilled in the art. Among other things, the various embodiments may be methods, systems, media or devices. Accordingly, the various embodiments may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments may be readily combined, without departing from the scope or spirit of the invention.

In addition, as used herein, the term "or" is an inclusive "or" operator and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

For example, embodiments, the following terms are also used herein according to the corresponding meaning, unless the context clearly dictates otherwise.

As used herein the term, "engine" refers to logic embodied in hardware or software instructions, which can be written in a programming language, such as C, C++, Objective-C, COBOL, Java™, PHP, Perl, JavaScript, Ruby, VBScript, Microsoft.NET™ languages such as C#, or the like. An engine may be compiled into executable programs or written in interpreted programming languages. Software engines may be callable from other engines or from themselves. Engines described herein refer to one or more logical modules that can be merged with other engines or applications, or can be divided into sub-engines. The engines can be stored in non-transitory computer-readable medium or computer storage device and be stored on and executed by one or more general purpose computers, thus creating a special purpose computer configured to provide the engine.

As used herein the terms "file system object" refers to entities stored in a file system. These may include files, directories, or the like. In this document for brevity and clarity all objects stored in a file system may be referred to as file system objects.

As used herein the terms "file path," "file system path," or "hierarchical file system path," and so on refer to file system information that corresponds to the logical or physical locations of file system objects within file systems. File system clients may employ file system paths to refer to specific file system objects within a file system. For example, file paths may include fields or values that correspond to the hierarchy of directories in the file system that correspond to the location of the file system object. In some cases, the name or label of the file may be considered path of the file system path. Also, often file system paths may be human readable.

As used herein the terms "block," or "file system object block" refer to the file system data objects that comprise a file system object. For example, small sized file system objects, such as, directory objects or small files may be comprised of a single block. Whereas larger file system objects, such as large document files may be comprised of many blocks. Blocks usually are arranged to have a fixed size to simplify the management of a file system. This may include fixing blocks to a particular size based on requirements associated with underlying storage hardware, such as, solid state drives (SSDs) or hard disk drives (HDDs), or the like. However, file system objects, such as, files may be of various sizes, comprised of the number of blocks necessary to represent or contain the entire file system object.

As used herein the term "object store" refers to a data store that may be arranged to store data using individual chunks or blobs that may be associated with an object key. Clients of object stores may be enabled to access or otherwise administer objects based on their corresponding object key. In some cases, object stores may be provided by off-premises cloud computing providers. In other cases, an object store may be on-premises or otherwise local or private to an organization. Object stores may provide one or more APIs that enables data to be stored as objects. Typically, object stores or object store providers may provide various APIs for creating, updating, deleting, validating, or moving objects. Also, in some cases, object stores enable associating other meta-data in addition to object keys with stored objects.

As used herein the terms "document object," or "document" refer to file system objects that may be considered a file. Accordingly, document objects may include one or more blocks that represent one combined file. The term document may be used to distinguish file system objects that are files from file system objects that may represent directories, folders, blocks, or the like. Documents have one or more content blocks that store the data comprising the document. Herein, documents may represent files that store any type of compressed or uncompressed data, such as, text, binary data, media (e.g., video files, music files, images, sound files, or the like), application documents (e.g., word processing files, databases, programs, libraries, or the like), structured documents, or the like. Herein documents may be considered to be stored in a file system rather than an object store. Documents may be considered to have associated file system paths or other file system meta-data that may be irrelevant or unavailable on object stores.

As used herein the terms "epoch," or "file system epoch" refer to time periods in the life of a file system. Epochs may be generated sequentially such that epoch 1 comes before epoch 2 in time. Prior epochs are bounded in the sense that they have a defined beginning and end. The current epoch has a beginning but not an end because it is still running. Epochs may be used to track the birth and death of file system objects, or the like.

As used herein the term "snapshot" refers to a point time version of the file system or a portion of the file system. Snapshots preserve the version of the file system objects at the time the snapshot was taken. In some cases, snapshots may be sequentially labeled such that snapshot 1 is the first snapshot taken in a file system and snapshot 2 is the second snapshot, and so on. The sequential labeling may be file system-wide even though snapshots may cover the same or different portions of the file system. Snapshots demark the end of the current file system epoch and the beginning of the next file system epoch. Accordingly, in some embodiments, if a file system is arranged to count epochs and snapshots sequentially, the epoch value or its number label may be assumed to be greater than the number label of the newest snapshot. Epoch boundaries may be formed if a snapshot is taken. The epoch (e.g., epoch count value) may be incremented if a snapshot is created. Each epoch boundary is created when a snapshot was created. In some cases, if a new snapshot is created, it may be assigned a number label that has the same as the epoch it is closing and thus be one less than the new current epoch that begins running when the new snapshot is taken. Note, other formats of snapshots are contemplated as well as. One of ordinary skill in the art will appreciated that snapshots associated with epochs or snapshot numbers as described herein as examples that at least enable or disclose the innovations described herein.

As used herein the term "replication relationship" refers to data structures that define replication relationships between one or more file systems or one or more object stores that may be arranged such that one of the file systems is periodically backed up to one or more other file system or one or more object stores. The file system being replicated may be considered a source file system. If another file system is receiving the replicated objects from the source file system, it may be considered the target file system. Similarly, if an object store is receiving the replicated objects from the source file system, it may be considered a target object store.

As used herein the term "replication snapshot" refers to a snapshot that is generated for a replication job. Replication snapshots may be considered ephemeral snapshots that may be created and managed by the file system as a continuous replication process for replication the data of a source file system onto a target file system or target object store. Replication snapshots may be automatically created for replicating data in a source file system to a target file system or an object store. Replication snapshots may be automatically discarded if they are successfully copied to the target file system or the target object store.

As used herein the term "replication job" refers to one or more actions executed by a replication engine to copy the files from one or more portions of a file system to a target file system or a target object store. A replication job may be associated with one replication snapshot. In some cases, the replication snapshot may have been made prior to execution of the replication. In other cases, replication engines may create a snapshot of the file system before replicating files.

As used herein the term "object store" refers to a data store that may be arranged to store data using data chunks or data blobs that may be referred to as object store objects. Each object store object may be associated with an object key that may be used to identify or index the object store objects. Clients of object stores may be enabled to access or otherwise administer objects based on their corresponding object key. In some cases, object stores may be provided by off-premises cloud computing providers. In other cases, an object store may be on-premises or otherwise local or private to an organization. Object stores or object store providers may provide various APIs or interfaces that enable users, clients, external services, or the like, to perform various actions, including, creating object store objects, updating object store objects, deleting object store objects, validating object store objects, or moving object store objects. Also, in some cases, object stores enable associating other meta-data in addition to object keys with stored objects.

As used herein the term "object store object" refers to a blob or chunk of data stored and indexed in an object store. Document objects on a file system may be stored as object store objects on object stores. It may be assumed that if a document object is copied to an object store, the one or more blocks that comprise a document object on the file system may be stored in the object store object.

As used herein the term "configuration information" refers to information that may include rule-based policies, pattern matching, scripts (e.g., computer readable instructions), or the like, that may be provided from various sources, including, configuration files, databases, user input, built-in defaults, or the like, or combination thereof.

The following briefly describes embodiments of the invention in order to provide a basic understanding of some aspects of the invention. This brief description is not intended as an extensive overview. It is not intended to identify key or critical elements, or to delineate or otherwise narrow the scope. Its purpose is merely to present some concepts in a simplified form as a prelude to the more detailed description that is presented later.

Briefly stated, various embodiments are directed to managing data in a file system. In one or more of the various embodiments, a file system that includes a plurality of file system objects may be provided such that each file system object is associated with one or more hierarchical file paths in the file system.

In one or more of the various embodiments, an object store that may be associated with the file system may be provided based on a replication relationship that declares one or more portions of the file system to be copied to the object store.

In one or more of the various embodiments, one or more file system objects may be determined based on a traversal of the one or more portions of the file system.

In one or more of the various embodiments, in response to visiting a file system object that may be a document object and included in the one or more portions of the file system, performing further actions, including: determining a hierarchical file path of the document object that corresponds to a location in the file system based on the one or more file system objects that are one or more ancestor file system objects of the document object; generating an object key for the document object that encodes the hierarchical file path such that one or more portions of the object key correspond to the one or more ancestor file system objects; copying the document object and the object key to the object store such that the document object may be stored in the object store as an object store object, and such that the object store object may be indexed using an unordered index based on the object key; or the like.

In some embodiments, replication engines may be arranged to copy two or more document objects to the object store in parallel such that the two or more documents object may be copied at the same time or the two or more document objects may be copied in an order that may be independent of their location in the file system.

In one or more of the various embodiments, in response to visiting another file system object that may be a link to another document object, performing further actions, including: employing the file system and the link to determine the other document object; generating another object key that encodes another hierarchical file path that corresponds to the other document object; determining another object store object in the object store based on the other object key; duplicating the other object store object in the object store such that the duplicated object store object may be associated with the object key; and the like.

In one or more of the various embodiments, a validation key may be generated based on content that may be included in the document object such that the validation key includes a checksum value that corresponds to the content. Also, in one or more of the various embodiments, the validation key may be associated with the document object as meta-data that may be stored on the object store with the object store object that corresponds to the document object.

In one or more of the various embodiments, copying the document object and the object key to the object store may include: determining one or more storage containers in the object store such that the object store may be located in one or more cloud computing environments and such that the one or more storage containers store one or more object store objects in one or more unordered collections; generating the object store object that corresponds to the document object based on providing the document object to the object store such that the object store object may be stored in the one or more storage containers; or the like.

In one or more of the various embodiments, determining a root file system object that may be a parent file system object of the one or more portions of the file system based on the file system. And, in one or more of the various embodiments, initiating the traversal of the one or more portions of the file system at the root file system object.

In one or more of the various embodiments, determining the one or more file system objects based on the traversal may include: determining a previous replication snapshot based on metadata associated with the file system. And, in one or more of the various embodiments, generating a replication snapshot on the file system that includes the one or more file system objects based on the replication snapshot and the previous replication snapshot such that the included one or more file system objects may be associated with changes that may be omitted from the previous replication snapshot and such that a remainder of file system objects of the plurality of file system objects may be excluded from being copied to the object store.

In one or more of the various embodiments, copying the document object and the object key to the object store may include: in response to an error message from the object store, performing further actions, including: determining a type of the error corresponding to the error message based on the error message and the object store; in response to the error message corresponding to a transient error, retry copying the document object and the object key to the object store; and in response to the error message corresponding to an irreparable error, aborting the traversal of the one or more portions of the file system.

Illustrated Operating Environment

FIG. 1 shows components of one embodiment of an environment in which embodiments of the invention may be practiced. Not all of the components may be required to practice the invention, and variations in the arrangement and type of the components may be made without departing from the spirit or scope of the invention. As shown, system 100 of FIG. 1 includes local area networks (LANs)/wide area networks (WANs)–(network) 110, wireless network 108, client computers 102-105, application server computer 116, file system management server computer 118, object store 120, or the like.

At least one embodiment of client computers 102-105 is described in more detail below in conjunction with FIG. 2. In one embodiment, at least some of client computers 102-105 may operate over one or more wired or wireless networks, such as networks 108, or 110. Generally, client computers 102-105 may include virtually any computer capable of communicating over a network to send and receive information, perform various online activities, offline actions, or the like. In one embodiment, one or more of client computers 102-105 may be configured to operate within a business or other entity to perform a variety of services for the business or other entity. For example, client computers 102-105 may be configured to operate as a web server, firewall, client application, media player, mobile telephone, game console, desktop computer, or the like. However, client computers 102-105 are not constrained to these services and may also be employed, for example, as for end-user computing in other embodiments. It should be recognized that more or less client computers (as shown in FIG. 1) may be included within a system such as described herein, and embodiments are therefore not constrained by the number or type of client computers employed.

Computers that may operate as client computer 102 may include computers that typically connect using a wired or wireless communications medium such as personal computers, multiprocessor systems, microprocessor-based or programmable electronic devices, network PCs, or the like. In some embodiments, client computers 102-105 may include virtually any portable computer capable of connecting to another computer and receiving information such as, laptop computer 103, mobile computer 104, tablet computers 105, or the like. However, portable computers are not so limited and may also include other portable computers such as cellular telephones, display pagers, radio frequency (RF) devices, infrared (IR) devices, Personal Digital Assistants (PDAs), handheld computers, wearable computers, integrated devices combining one or more of the preceding computers, or the like. As such, client computers 102-105 typically range widely in terms of capabilities and features. Moreover, client computers 102-105 may access various computing applications, including a browser, or other web-based application.

A web-enabled client computer may include a browser application that is configured to send requests and receive responses over the web. The browser application may be configured to receive and display graphics, text, multimedia, and the like, employing virtually any web-based language. In one embodiment, the browser application is enabled to employ JavaScript, HyperText Markup Language (HTML), eXtensible Markup Language (XML), JavaScript Object Notation (JSON), Cascading Style Sheets (CSS), or the like, or combination thereof, to display and send a message. In one embodiment, a user of the client computer may employ the browser application to perform various activities over a network (online). However, another application may also be used to perform various online activities.

Client computers 102-105 also may include at least one other client application that is configured to receive or send content between another computer. The client application may include a capability to send or receive content, or the like. The client application may further provide information that identifies itself, including a type, capability, name, and the like. In one embodiment, client computers 102-105 may uniquely identify themselves through any of a variety of mechanisms, including an Internet Protocol (IP) address, a phone number, Mobile Identification Number (MIN), an electronic serial number (ESN), a client certificate, or other device identifier. Such information may be provided in one or more network packets, or the like, sent between other client computers, application server computer 116, file system management server computer 118, object store 120, or other computers.

Client computers 102-105 may further be configured to include a client application that enables an end-user to log into an end-user account that may be managed by another computer, such as application server computer 116, file system management server computer 118, object store 120, or the like. Such an end-user account, in one non-limiting example, may be configured to enable the end-user to manage one or more online activities, including in one non-limiting example, project management, software development, system administration, configuration management, search activities, social networking activities, browse various websites, communicate with other users, or the like. Also, client computers may be arranged to enable users to display reports, interactive user-interfaces, or results provided by application server computer 116, file system management server computer 118, object store 120, or the like.

Wireless network 108 is configured to couple client computers 103-105 and its components with network 110. Wireless network 108 may include any of a variety of wireless sub-networks that may further overlay stand-alone ad-hoc networks, and the like, to provide an infrastructure-oriented connection for client computers 103-105. Such sub-networks may include mesh networks, Wireless LAN (WLAN) networks, cellular networks, and the like. In one embodiment, the system may include more than one wireless network.

Wireless network 108 may further include an autonomous system of terminals, gateways, routers, and the like connected by wireless radio links, and the like. These connectors may be configured to move freely and randomly and organize themselves arbitrarily, such that the topology of wireless network 108 may change rapidly.

Wireless network 108 may further employ a plurality of access technologies including 2nd (2G), 3rd (3G), 4th (4G) 5th (5G) generation radio access for cellular systems, WLAN, Wireless Router (WR) mesh, and the like. Access technologies such as 2G, 3G, 4G, 5G, and future access networks may enable wide area coverage for mobile computers, such as client computers 103-105 with various degrees of mobility. In one non-limiting example, wireless network 108 may enable a radio connection through a radio network access such as Global System for Mobil communication (GSM), General Packet Radio Services (GPRS), Enhanced Data GSM Environment (EDGE), code division multiple access (CDMA), time division multiple access (TDMA), Wideband Code Division Multiple Access (WCDMA), High Speed Downlink Packet Access (HSDPA), Long Term Evolution (LTE), and the like. In essence, wireless network 108 may include virtually any wireless communication mechanism by which information may travel between client computers 103-105 and another computer, network, a cloud-based network, a cloud instance, or the like.

Network 110 is configured to couple network computers with other computers, including, application server computer 116, file system management server computer 118, object store 120, client computers 102, and client computers 103-105 through wireless network 108, or the like. Network 110 is enabled to employ any form of computer readable media for communicating information from one electronic device to another. Also, network 110 can include the Internet in addition to local area networks (LANs), wide area networks (WANs), direct connections, such as through a universal serial bus (USB) port, Ethernet port, other forms of computer-readable media, or any combination thereof. On an interconnected set of LANs, including those based on differing architectures and protocols, a router acts as a link between LANs, enabling messages to be sent from one to another. In addition, communication links within LANs typically include twisted wire pair or coaxial cable, while communication links between networks may utilize analog telephone lines, full or fractional dedicated digital lines including T1, T2, T3, and T4, or other carrier mechanisms including, for example, E-carriers, Integrated Services Digital Networks (ISDNs), Digital Subscriber Lines (DSLs), wireless links including satellite links, or other communications links known to those skilled in the art. Moreover, communication links may further employ any of a variety of digital signaling technologies, including without limit, for example, DS-0, DS-1, DS-2, DS-3, DS-4, OC-3, OC-12, OC-48, or the like. Furthermore, remote computers and other related electronic devices could be remotely connected to either LANs or WANs via a modem and temporary telephone link. In one embodiment, network 110 may be configured to transport information of an Internet Protocol (IP).

Additionally, communication media typically embodies computer readable instructions, data structures, program modules, or other transport mechanism and includes any information non-transitory delivery media or transitory delivery media. By way of example, communication media includes wired media such as twisted pair, coaxial cable, fiber optics, wave guides, and other wired media and wireless media such as acoustic, RF, infrared, and other wireless media.

Also, one embodiment of file system management server computer 118 is described in more detail below in conjunction with FIG. 3. Although FIG. 1 illustrates file system management server computer 118, or the like, as a single computer, the innovations or embodiments described herein are not so limited. For example, one or more functions of file system management server computer 118, or the like, may be distributed across one or more distinct network computers. Moreover, in one or more embodiments, file system management server computer 118 may be implemented using a plurality of network computers. Further, in one or more of the various embodiments, file system management server computer 118, or the like, may be implemented using one or more cloud instances in one or more cloud networks. Accordingly, these innovations and embodiments are not to be construed as being limited to a single environment, and other configurations, and other architectures are also envisaged.

Further, object stores, such as, object store 120 may represent one or more data storage facilities that may be arranged to store data using individual chunks or blobs that may be associated with an object key. Clients, such as, client computers 102-105, application server computers, such as, application server computer 116, or file system management server computers, such as, file system management server computer 118, may be enabled to access or otherwise administer objects in object store 120. In some cases, object stores may be provided by off-premises cloud computing providers. In other cases, object stores may be on-premises or otherwise local or private to an organization.

Illustrative Client Computer

Figure 2:
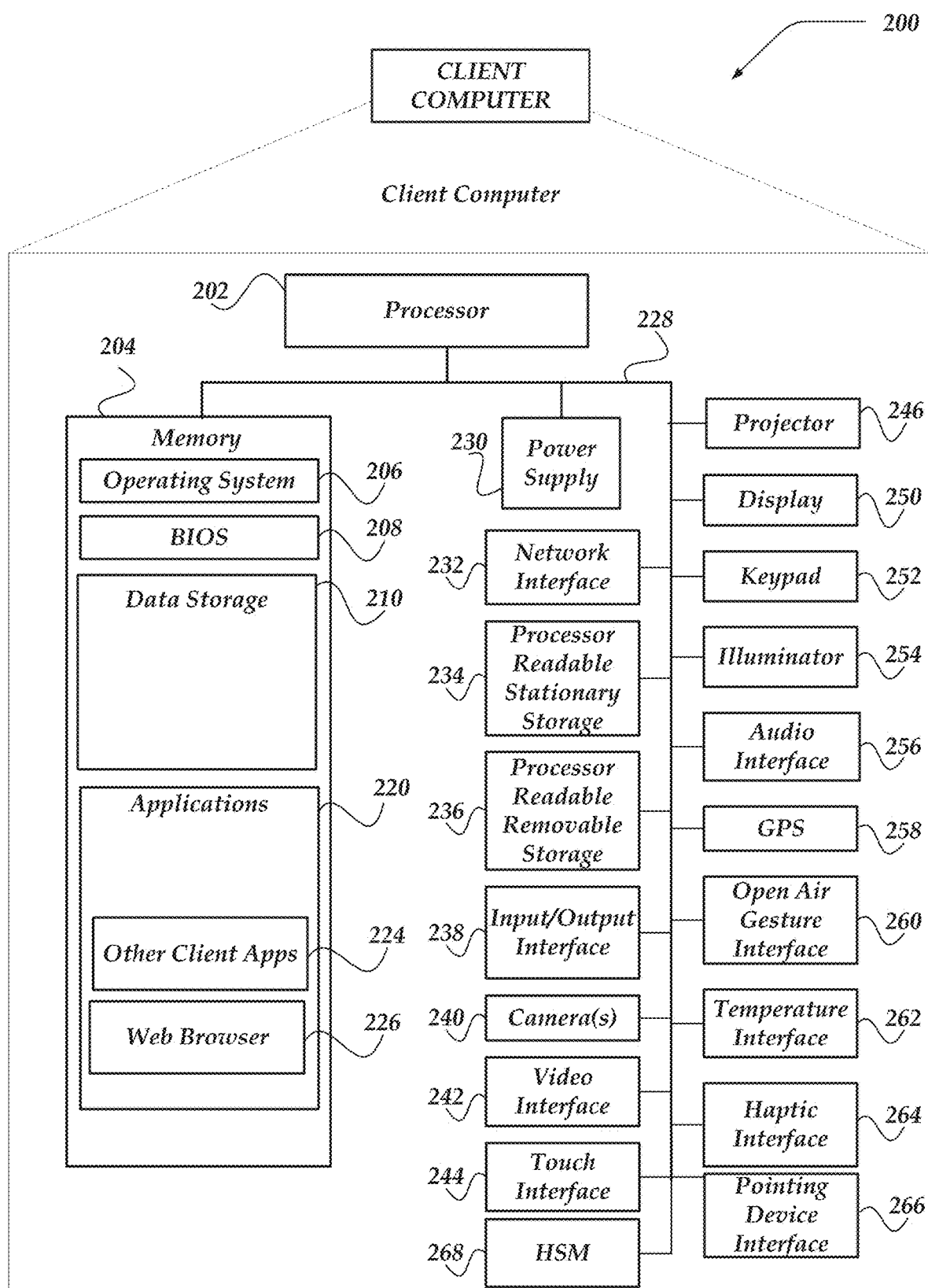
FIG. 2 illustrates a schematic embodiment of a client computer.

FIG. 2 shows one embodiment of client computer 200 that may include many more or less components than those shown. Client computer 200 may represent, for example, one or more embodiment of mobile computers or client computers shown in FIG. 1.

Client computer 200 may include processor 202 in communication with memory 204 via bus 228. Client computer 200 may also include power supply 230, network interface 232, audio interface 256, display 250, keypad 252, illuminator 254, video interface 242, input/output interface 238, haptic interface 264, global positioning systems (GPS) receiver 258, open air gesture interface 260, temperature interface 262, camera(s) 240, projector 246, pointing device interface 266, processor-readable stationary storage device 234, and processor-readable removable storage device 236. Client computer 200 may optionally communicate with a base station (not shown), or directly with another computer. And in one embodiment, although not shown, a gyroscope may be employed within client computer 200 to measuring or maintaining an orientation of client computer 200.

Power supply 230 may provide power to client computer 200. A rechargeable or non-rechargeable battery may be used to provide power. The power may also be provided by an external power source, such as an AC adapter or a powered docking cradle that supplements or recharges the battery.

Network interface 232 includes circuitry for coupling client computer 200 to one or more networks, and is constructed for use with one or more communication protocols and technologies including, but not limited to, protocols and technologies that implement any portion of the OSI model for mobile communication (GSM), CDMA, time division multiple access (TDMA), UDP, TCP/IP, SMS, MMS, GPRS, WAP, UWB, WiMax, SIP/RTP, GPRS, EDGE, WCDMA, LTE, UMTS, OFDM, CDMA2000, EV-DO, HSDPA, 5G, or any of a variety of other wireless communication protocols. Network interface 232 is sometimes known as a transceiver, transceiving device, or network interface card (MC).

Audio interface 256 may be arranged to produce and receive audio signals such as the sound of a human voice. For example, audio interface 256 may be coupled to a speaker and microphone (not shown) to enable telecommunication with others or generate an audio acknowledgment for some action. A microphone in audio interface 256 can also be used for input to or control of client computer 200, e.g., using voice recognition, detecting touch based on sound, and the like.

Display 250 may be a liquid crystal display (LCD), gas plasma, electronic ink, light emitting diode (LED), Organic LED (OLED) or any other type of light reflective or light transmissive display that can be used with a computer. Display 250 may also include a touch interface 244 arranged to receive input from an object such as a stylus or a digit from a human hand, and may use resistive, capacitive, surface acoustic wave (SAW), infrared, radar, or other technologies to sense touch or gestures.

Projector 246 may be a remote handheld projector or an integrated projector that is capable of projecting an image on a remote wall or any other reflective object such as a remote screen.

Video interface 242 may be arranged to capture video images, such as a still photo, a video segment, an infrared video, or the like. For example, video interface 242 may be coupled to a digital video camera, a web-camera, or the like. Video interface 242 may comprise a lens, an image sensor, and other electronics. Image sensors may include a complementary metal-oxide-semiconductor (CMOS) integrated circuit, charge-coupled device (CCD), or any other integrated circuit for sensing light.

Keypad 252 may comprise any input device arranged to receive input from a user. For example, keypad 252 may include a push button numeric dial, or a keyboard. Keypad 252 may also include command buttons that are associated with selecting and sending images.

Illuminator 254 may provide a status indication or provide light. Illuminator 254 may remain active for specific periods of time or in response to event messages. For example, when illuminator 254 is active, it may back-light the buttons on keypad 252 and stay on while the client computer is powered. Also, illuminator 254 may back-light these buttons in various patterns when particular actions are performed, such as dialing another client computer. Illuminator 254 may also cause light sources positioned within a transparent or translucent case of the client computer to illuminate in response to actions.

Further, client computer 200 may also comprise hardware security module (HSM) 268 for providing additional tamper resistant safeguards for generating, storing or using security/cryptographic information such as, keys, digital certificates, passwords, passphrases, two-factor authentication information, or the like. In some embodiments, hardware security module may be employed to support one or more standard public key infrastructures (PKI), and may be employed to generate, manage, or store keys pairs, or the like. In some embodiments, HSM 268 may be a stand-alone computer, in other cases, HSM 268 may be arranged as a hardware card that may be added to a client computer.

Client computer 200 may also comprise input/output interface 238 for communicating with external peripheral devices or other computers such as other client computers and network computers. The peripheral devices may include an audio headset, virtual reality headsets, display screen glasses, remote speaker system, remote speaker and microphone system, and the like. Input/output interface 238 can utilize one or more technologies, such as Universal Serial Bus (USB), Infrared, WiFi, WiMax, Bluetooth™, and the like.

Input/output interface 238 may also include one or more sensors for determining geolocation information (e.g., GPS), monitoring electrical power conditions (e.g., voltage sensors, current sensors, frequency sensors, and so on), monitoring weather (e.g., thermostats, barometers, anemometers, humidity detectors, precipitation scales, or the like), or the like. Sensors may be one or more hardware sensors that collect or measure data that is external to client computer 200.

Haptic interface 264 may be arranged to provide tactile feedback to a user of the client computer. For example, the haptic interface 264 may be employed to vibrate client computer 200 in a particular way when another user of a computer is calling. Temperature interface 262 may be used to provide a temperature measurement input or a temperature changing output to a user of client computer 200. Open air gesture interface 260 may sense physical gestures of a user of client computer 200, for example, by using single or stereo video cameras, radar, a gyroscopic sensor inside a computer held or worn by the user, or the like. Camera 240 may be used to track physical eye movements of a user of client computer 200.

GPS transceiver 258 can determine the physical coordinates of client computer 200 on the surface of the Earth, which typically outputs a location as latitude and longitude values. GPS transceiver 258 can also employ other geo-positioning mechanisms, including, but not limited to, tri-angulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of client computer 200 on the surface of the Earth. It is understood that under different conditions, GPS transceiver 258 can determine a physical location for client computer 200. In one or more embodiments, however, client computer 200 may, through other components, provide other information that may be employed to determine a physical location of the client computer, including for example, a Media Access Control (MAC) address, IP address, and the like.

In at least one of the various embodiments, applications, such as, operating system 206, other client apps 224, web browser 226, or the like, may be arranged to employ geo-location information to select one or more localization features, such as, time zones, languages, currencies, calendar formatting, or the like. Localization features may be used in display objects, data models, data objects, user-interfaces, reports, as well as internal processes or databases. In at least one of the various embodiments, geo-location information used for selecting localization information may be provided by GPS 258. Also, in some embodiments, geolocation information may include information provided using one or more geolocation protocols over the networks, such as, wireless network 108 or network 111.

Human interface components can be peripheral devices that are physically separate from client computer 200, allowing for remote input or output to client computer 200. For example, information routed as described here through human interface components such as display 250 or keyboard 252 can instead be routed through network interface 232 to appropriate human interface components located remotely. Examples of human interface peripheral components that may be remote include, but are not limited to, audio devices, pointing devices, keypads, displays, cameras, projectors, and the like. These peripheral components may communicate over a Pico Network such as Bluetooth™, Zigbee™ and the like. One non-limiting example of a client computer with such peripheral human interface components is a wearable computer, which might include a remote pico projector along with one or more cameras that remotely communicate with a separately located client computer to sense a user's gestures toward portions of an image projected by the pico projector onto a reflected surface such as a wall or the user's hand.

A client computer may include web browser application 226 that is configured to receive and to send web pages, web-based messages, graphics, text, multimedia, and the like. The client computer's browser application may employ virtually any programming language, including a wireless application protocol messages (WAP), and the like. In one or more embodiments, the browser application is enabled to employ Handheld Device Markup Language (HDML), Wireless Markup Language (WML), WMLScript, JavaScript, Standard Generalized Markup Language (SGML), HyperText Markup Language (HTML), eXtensible Markup Language (XML), HTML5, and the like.

Memory 204 may include RAM, ROM, or other types of memory. Memory 204 illustrates an example of computer-readable storage media (devices) for storage of information such as computer-readable instructions, data structures, program modules or other data. Memory 204 may store BIOS 208 for controlling low-level operation of client computer 200. The memory may also store operating system 206 for controlling the operation of client computer 200. It will be appreciated that this component may include a general-purpose operating system such as a version of UNIX, or Linux®, or a specialized client computer communication operating system such as Windows Phone™, or the Apple Corporation's iOS or macOS® operating systems. The operating system may include, or interface various runtime engines, including Java virtual machines, or the like, that may enable control of hardware components or operating system operations via application programs supported by the various runtime engines.

Memory 204 may further include one or more data storage 210, which can be utilized by client computer 200 to store, among other things, applications 220 or other data. For example, data storage 210 may also be employed to store information that describes various capabilities of client computer 200. The information may then be provided to another device or computer based on any of a variety of methods, including being sent as part of a header during a communication, sent upon request, or the like. Data storage 210 may also be employed to store social networking information including address books, buddy lists, aliases, user profile information, or the like. Data storage 210 may further include program code, data, algorithms, and the like, for use by a processor, such as processor 202 to execute and perform actions. In one embodiment, at least some of data storage 210 might also be stored on another component of client computer 200, including, but not limited to, non-transitory processor-readable removable storage device 236, processor-readable stationary storage device 234, or even external to the client computer.

Applications 220 may include computer executable instructions which, when executed by client computer 200, transmit, receive, or otherwise process instructions and data. Applications 220 may include, for example other client applications 224, web browser 226, or the like. Client computers may be arranged to exchange communications one or more servers.

Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, visualization applications, and so forth.

Additionally, in one or more embodiments (not shown in the figures), client computer 200 may include an embedded logic hardware device instead of a CPU, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. Also, in one or more embodiments (not shown in the figures), client computer 200 may include one or more hardware micro-controllers instead of CPUs. In one or more embodiments, the one or more micro-controllers may directly execute their own embedded logic to perform actions and access its own internal memory and its own external Input and Output Interfaces (e.g., hardware pins or wireless transceivers) to perform actions, such as System on a Chip (SOC), or the like.

Illustrative Network Computer

Figure 3:
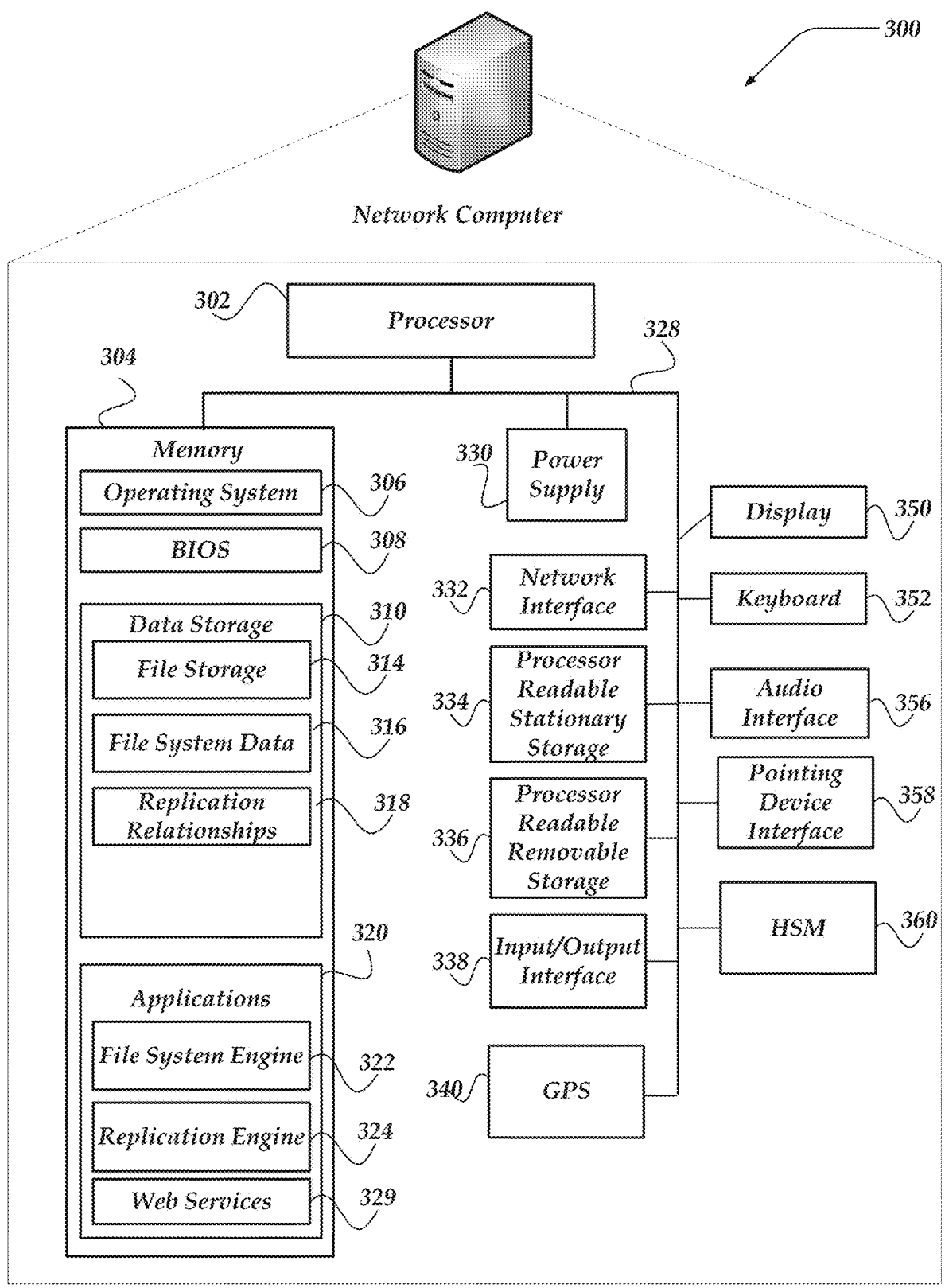
FIG. 3 illustrates a schematic embodiment of a network computer.

FIG. 3 shows one embodiment of network computer 300 that may be included in a system implementing one or more of the various embodiments. Network computer 300 may include many more or less components than those shown in FIG. 3. However, the components shown are sufficient to disclose an illustrative embodiment for practicing these innovations. Network computer 300 may represent, for example, one or more embodiments of a file system management server computer such as file system management server computer 118, or the like, of FIG. 1.

Network computers, such as, network computer 300 may include a processor 302 that may be in communication with a memory 304 via a bus 328. In some embodiments, processor 302 may be comprised of one or more hardware processors, or one or more processor cores. In some cases, one or more of the one or more processors may be specialized processors designed to perform one or more specialized actions, such as, those described herein. Network computer 300 also includes a power supply 330, network interface 332, audio interface 356, display 350, keyboard 352, input/output interface 338, processor-readable stationary storage device 334, and processor-readable removable storage device 336. Power supply 330 provides power to network computer 300.

Network interface 332 includes circuitry for coupling network computer 300 to one or more networks, and is constructed for use with one or more communication protocols and technologies including, but not limited to, protocols and technologies that implement any portion of the Open Systems Interconnection model (OSI model), global system for mobile communication (GSM), code division multiple access (CDMA), time division multiple access (TDMA), user datagram protocol (UDP), transmission control protocol/Internet protocol (TCP/IP), Short Message Service (SMS), Multimedia Messaging Service (MMS), general packet radio service (GPRS), WAP, ultra-wide band (UWB), IEEE 802.16 Worldwide Interoperability for Microwave Access (WiMax), Session Initiation Protocol/Real-time Transport Protocol (SIP/RTP), 5G, or any of a variety of other wired and wireless communication protocols. Network interface 332 is sometimes known as a transceiver, transceiving device, or network interface card (NIC). Network computer 300 may optionally communicate with a base station (not shown), or directly with another computer.

Audio interface 356 is arranged to produce and receive audio signals such as the sound of a human voice. For example, audio interface 356 may be coupled to a speaker and microphone (not shown) to enable telecommunication with others or generate an audio acknowledgment for some action. A microphone in audio interface 356 can also be used for input to or control of network computer 300, for example, using voice recognition.

Display 350 may be a liquid crystal display (LCD), gas plasma, electronic ink, light emitting diode (LED), Organic LED (OLED) or any other type of light reflective or light transmissive display that can be used with a computer. In some embodiments, display 350 may be a handheld projector or pico projector capable of projecting an image on a wall or other object.

Network computer 300 may also comprise input/output interface 338 for communicating with external devices or computers not shown in FIG. 3. Input/output interface 338 can utilize one or more wired or wireless communication technologies, such as USB™, Firewire™, WiFi, WiMax, Thunderbolt™, Infrared, Bluetooth™, Zigbee™, serial port, parallel port, and the like.

Also, input/output interface 338 may also include one or more sensors for determining geolocation information (e.g., GPS), monitoring electrical power conditions (e.g., voltage sensors, current sensors, frequency sensors, and so on), monitoring weather (e.g., thermostats, barometers, anemometers, humidity detectors, precipitation scales, or the like), or the like. Sensors may be one or more hardware sensors that collect or measure data that is external to network computer 300. Human interface components can be physically separate from network computer 300, allowing for remote input or output to network computer 300. For example, information routed as described here through human interface components such as display 350 or keyboard 352 can instead be routed through the network interface 332 to appropriate human interface components located elsewhere on the network. Human interface components include any component that allows the computer to take input from, or send output to, a human user of a computer. Accordingly, pointing devices such as mice, styluses, track balls, or the like, may communicate through pointing device interface 358 to receive user input.

GPS transceiver 340 can determine the physical coordinates of network computer 300 on the surface of the Earth, which typically outputs a location as latitude and longitude values. GPS transceiver 340 can also employ other geopositioning mechanisms, including, but not limited to, triangulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of network computer 300 on the surface of the Earth. It is understood that under different conditions, GPS transceiver 340 can determine a physical location for network computer 300. In one or more embodiments, however, network computer 300 may, through other components, provide other information that may be employed to determine a physical location of the client computer, including for example, a Media Access Control (MAC) address, IP address, and the like.

In at least one of the various embodiments, applications, such as, operating system 306, file system engine 322, replication engine 324, web services 329, or the like, may be arranged to employ geo-location information to select one or more localization features, such as, time zones, languages, currencies, currency formatting, calendar formatting, or the like. Localization features may be used in user interfaces, dashboards, reports, as well as internal processes or databases. In at least one of the various embodiments, geo-location information used for selecting localization information may be provided by GPS 340. Also, in some embodiments, geolocation information may include information provided using one or more geolocation protocols over the networks, such as, wireless network 108 or network 111.

Memory 304 may include Random Access Memory (RAM), Read-Only Memory (ROM), or other types of memory. Memory 304 illustrates an example of computer-readable storage media (devices) for storage of information such as computer-readable instructions, data structures, program modules or other data. Memory 304 stores a basic input/output system (BIOS) 308 for controlling low-level operation of network computer 300. The memory also stores an operating system 306 for controlling the operation of network computer 300. It will be appreciated that this component may include a general-purpose operating system such as a version of UNIX, or Linux®, or a specialized operating system such as Microsoft Corporation's Windows® operating system, or the Apple Corporation's macOS® operating system. The operating system may include, or interface with one or more virtual machine modules, such as, a Java virtual machine module that enables control of hardware components or operating system operations via Java application programs. Likewise, other runtime environments may be included.

Memory 304 may further include one or more data storage 310, which can be utilized by network computer 300 to store, among other things, applications 320 or other data. For example, data storage 310 may also be employed to store information that describes various capabilities of network computer 300. The information may then be provided to another device or computer based on any of a variety of methods, including being sent as part of a header during a communication, sent upon request, or the like. Data storage 310 may also be employed to store social networking information including address books, friend lists, aliases, user profile information, or the like. Data storage 310 may further include program code, data, algorithms, and the like, for use by a processor, such as processor 302 to execute and perform actions such as those actions described below. In one embodiment, at least some of data storage 310 might also be stored on another component of network computer 300, including, but not limited to, non-transitory media inside processor-readable removable storage device 336, processor-readable stationary storage device 334, or any other computer-readable storage device within network computer 300, or even external to network computer 300. Data storage 310 may include, for example, file storage 314, file system data 316, replication relationships 318, or the like.

Applications 320 may include computer executable instructions which, when executed by network computer 300, transmit, receive, or otherwise process messages (e.g., SMS, Multimedia Messaging Service (MMS), Instant Message (IM), email, or other messages), audio, video, and enable telecommunication with another user of another mobile computer. Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, and so forth. Applications 320 may include file system engine 322, replication engine 324, web services 329, or the like, that may be arranged to perform actions for embodiments described below. In one or more of the various embodiments, one or more of the applications may be implemented as modules or components of another application. Further, in one or more of the various embodiments, applications may be implemented as operating system extensions, modules, plugins, or the like.

Furthermore, in one or more of the various embodiments, file system engine 322, replication engine 324, web services 329, or the like, may be operative in a cloud-based computing environment. In one or more of the various embodiments, these applications, and others, that comprise the management platform may be executing within virtual machines or virtual servers that may be managed in a cloud-based based computing environment. In one or more of the various embodiments, in this context the applications may flow from one physical network computer within the cloud-based environment to another depending on performance and scaling considerations automatically managed by the cloud computing environment. Likewise, in one or more of the various embodiments, virtual machines or virtual servers dedicated to file system engine 322, replication engine 324, web services 329, or the like, may be provisioned and de-commissioned automatically.

Also, in one or more of the various embodiments, file system engine 322, replication engine 324, web services 329, or the like, may be located in virtual servers running in a cloud-based computing environment rather than being tied to one or more specific physical network computers.

Further, network computer 300 may also comprise hardware security module (HSM) 360 for providing additional tamper resistant safeguards for generating, storing or using security/cryptographic information such as, keys, digital certificates, passwords, passphrases, two-factor authentication information, or the like. In some embodiments, hardware security modules may be employed to support one or more standard public key infrastructures (PKI), and may be employed to generate, manage, or store keys pairs, or the like. In some embodiments, HSM 360 may be a stand-alone network computer, in other cases, HSM 360 may be arranged as a hardware card that may be installed in a network computer.

Additionally, in one or more embodiments (not shown in the figures), network computer 300 may include an embedded logic hardware device instead of a CPU, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. Also, in one or more embodiments (not shown in the figures), the network computer may include one or more hardware microcontrollers instead of a CPU. In one or more embodiments, the one or more microcontrollers may directly execute their own embedded logic to perform actions and access their own internal memory and their own external Input and Output Interfaces (e.g., hardware pins or wireless transceivers) to perform actions, such as System on a Chip (SOC), or the like.

Illustrative Logical System Architecture

Figure 4:
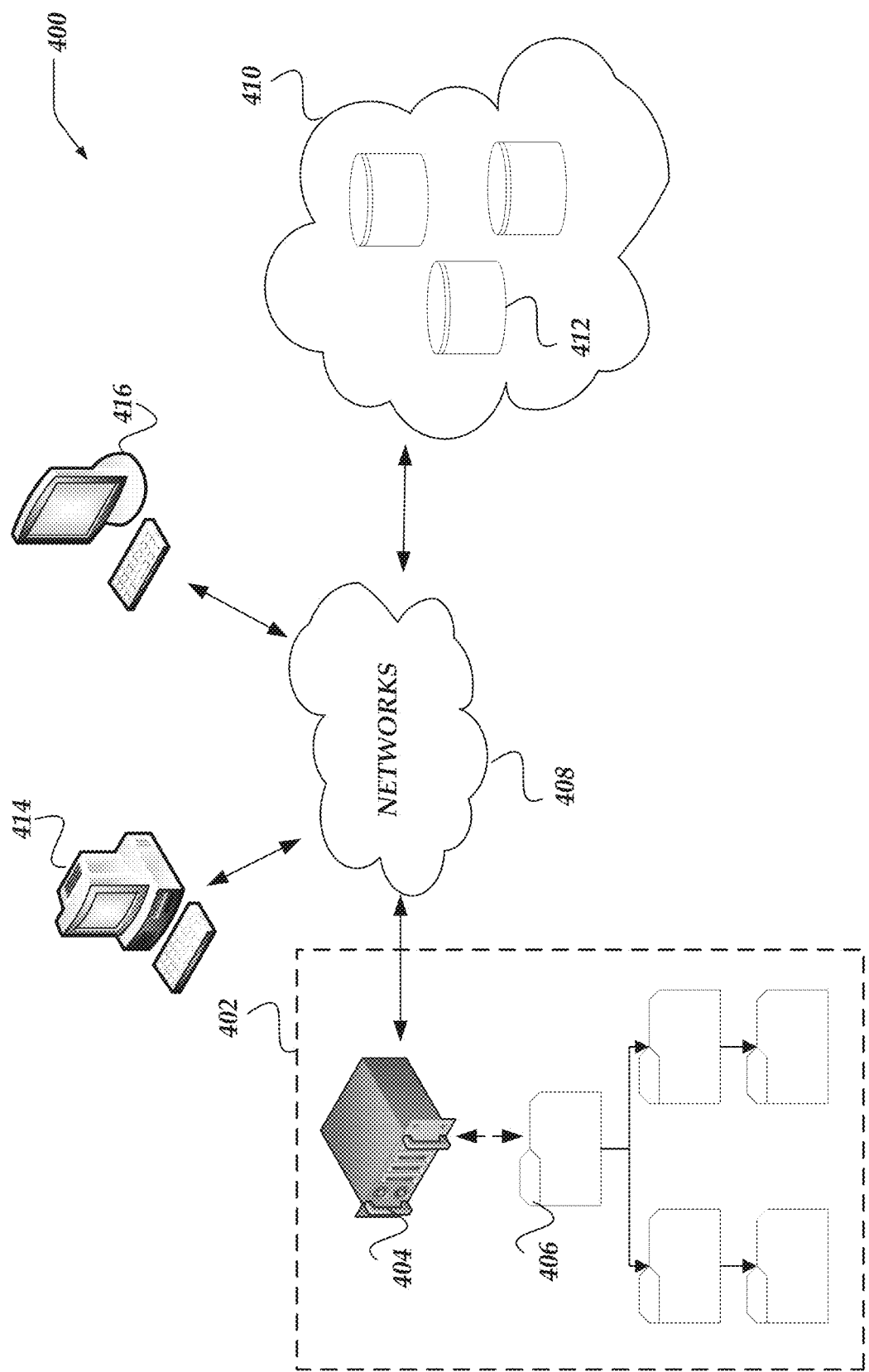
FIG. 4 illustrates a logical architecture of a system for replicating files in distributed file systems using object-based data storage in accordance with one or more of the various embodiments.

FIG. 4 illustrates a logical architecture of system 400 for replicating files in distributed file systems using object-based data storage in accordance with one or more of the various embodiments. In one or more of the various embodiments, one or more file systems, such as, file system 402 and one or more object stores, such as, object store 410 may be arranged to be communicatively coupled to one or more networks, such as, networks 408. Accordingly, in one or more of the various embodiments, one or more clients, such as, client computer 414 or client computer 416 may be arranged to access file system 402 or object store 410 over networks 408. In some embodiments, clients of file system 402 or object store 410 may include users, services, programs, computers, devices, or the like, that may be enabled to perform one or more data related operations, such as, creating, reading, updating, or deleting data (e.g., file system objects, documents, or object store objects) that may be stored in file system 402 or object store 410.

In some embodiments, file system 402 may comprise one or more file system management computers, such as file system management computer 404. Also, in one or more of the various embodiments, file systems, such as file system 402 may include one or more file system objects, such as file system object 406. In one or more of the various embodiments, file system object 406 may be considered to represent the various file system objects, documents objects, or entities that may be stored in file system 402. In some embodiments, file system objects may include, files, documents, directories, folders, backups, snapshots, replication snapshots, replication information, or the like.

In one or more of the various embodiments, the implementation details that enable file system 402 to provide file system services may be hidden from clients, such that they may be arranged to use file system 402 the same way they use other conventional local or remote file systems. Accordingly, in one or more of the various embodiments, clients may be unaware that they are using a distributed file system that supports replicating files in distributed file systems using object-based data storage because file system engines or replication engines may be arranged to mimic the interface or behavior of one or more conventional file systems.

Also, while file system 402 is illustrated as using one file system management computer with one set of file system objects, these innovations are not so limited. Innovations herein contemplate file systems that include one or more file system management computers or one or more file system object data stores. In some embodiments, file system objects may be located remotely from one or more file system management computers. Also, a logical file system object store or file system may be spread across two or more cloud computing environments, storage clusters, or the like.

In some embodiments, one or more replication engines, such as, replication engine 324 may be running on a file system management computer, such as, file system management computer 404. In some embodiments, replication engines may be arranged to perform actions to replicate of one or more portions of one or more file systems onto object stores, such as, object store 410.

In one or more of the various embodiments, it may be desirable to configure file systems, such as, file system 402 to be replicated onto one or more object stores, such as, object store 410. Accordingly, upon being triggered (e.g., via schedules, user input, continuous replication, or the like), a replication engine running on a source file system, such as, file system 402 may be arranged to replicate one or more portions its document objects on one or more object stores, such as, object store 410.

In one or more of the various embodiments, replication engines may be arranged to enable users to determine one or more portions of a source file system to replicate onto an object store. Accordingly, in some embodiments, replication engines may be arranged to provide one or more replication relationships that define which portions of a file system, if any, should have its documents replicated on object stores.

In one or more of the various embodiments, replication engines may be arranged to enable point-in-time snapshots to be preserved based on rules defined in replication relationships. Accordingly, in some embodiments, replication engines may be arranged to enable one or more snapshot policies to be associated with one or more replication relationships. In some embodiments, associating snapshot policies with replication relationships indicates that snapshots associated with the associated snapshot policies may be backed up on object stores associated with the replication relationships.

Figure 5:
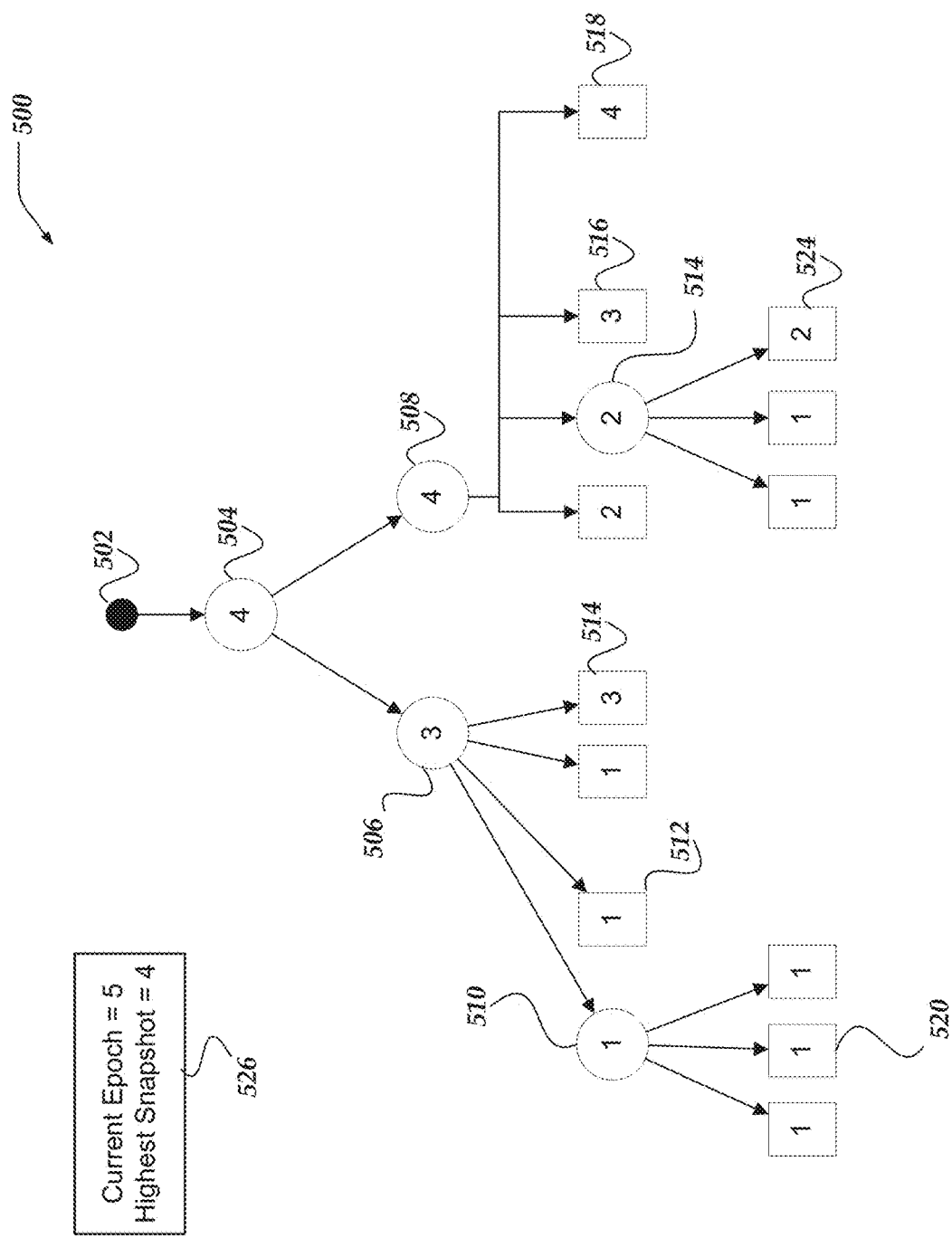
FIG. 5 illustrates a logical schematic of a file system for replicating files in distributed file systems using object-based data storage in accordance with one or more of the various embodiments.

FIG. 5 discloses how, one or more of the various embodiments may be arranged to manage or generate snapshots. However, in some embodiments, the innovations described herein are not limited to a particular form or format of snapshots, point-in-time snapshots, or the like. Accordingly, in some embodiments, replication engines may be arranged to generate replication snapshots differently. And, one of ordinary skill in the art will appreciate that file systems may employ various snapshot mechanisms or snapshot facilities. Thus, one of ordinary skill in the art will appreciate that the descriptions below are at least sufficient for disclosing the innovations included herein.

FIG. 5 illustrates a logical schematic of file system 500 for replicating files in distributed file systems using object-based data storage in accordance with one or more of the various embodiments. In this example, for clarity and brevity file system 500 is represented as a tree, in practice, various data structures may be used to store the data that represents the tree-like structure of the file system. Data structures may include tabular formats that include keys, self-referencing fields, child-parent relationships, or the like, to implement tree data structures, such as, graphs, trees, or the like, for managing a file system, such as, file system 500.

In this example, circles are used to illustrate directory/folder file system objects. And, rectangles are used to represent other document objects, such as, files, documents, or the like. The number in the center of the file system object in FIG. 5 represents the last/latest snapshot associated with the given file system object.

In this example, for some embodiments, root 502 is the beginning of a portion of a file system. Root 502 is not a file system object per se, rather, it indicates a position in a distributed file system. Directory 504 represents the parent file system object of all the file system objects under root 502. Directory 504 is the parent of directory 506 and directory 508. Directory 510, document object 512, and document object 514 are children of directory 506; directory 514, file object 516, and document object 518 are direct children of directory 508; document object 520 is a direct child of directory 510; and document object 524 is a direct child of directory 514. Also, in this example, for some embodiments, meta-data 526 includes the current update epoch and highest snapshot number for file system 500.

In this example, file system objects in file system 500 are associated with snapshots ranging from snapshot 1 to snapshot 4. The current epoch is number 5. Each time a snapshot is generated, the current epoch is ended, and the new snapshot is associated with ending the current epoch. A new current epoch may then be generated by incrementing the last current epoch number. Accordingly, in this example, if another snapshot is generated, it will have a snapshot number of 5 and the current epoch will become epoch 6.

In one or more of the various embodiments, at steady-state, parent file system objects, such as, directory 504, directory 506, directory 508, directory 510, directory 514, or the like, have a snapshot number based on the most recent snapshot associated with any of its children. For example, in this example, directory 504 has a snapshot value of 4 because its descendant, document object 518 has a snapshot value of 4. Similarly, directory 508 has the same snapshot value as document object 518. Continuing with this example, this is because document object 518 was modified or created sometime after snapshot 3 was generated and before snapshot 4 was generated.

In one or more of the various embodiments, if file system objects are not modified subsequent to the generation follow-on snapshots, they remain associated with their current/last snapshot. For example, in this example, directory 514 is associated with snapshot 2 because for this example, it was modified or created after snapshot 1 was generated (during epoch 2) and has remained unmodified since then. Accordingly, by observation, a modification to document object 524 caused it to be associated with snapshot 2 which forced its parent, directory 514 to also be associated with snapshot 2. In other words, for some embodiments, if a file system object is modified in a current epoch, it will be associated with the next snapshot that closes or ends the current epoch.

Compare, for example, in some embodiments, how directory 510 is associated with snapshot 1 and all of its children are also associated with snapshot 1. This indicates that directory 510 and its children were created during epoch 1 before the first snapshot (snapshot 1) was generated and that they have remained unmodified subsequent to snapshot 1.

In one or more of the various embodiments, if file system 500 is being replicated, a replication engine, such as, replication engine 324, may be arranged to employ the snapshot or epoch information of the file system objects in a file system to determine which document objects should be copied to one or more object stores.

In one or more of the various embodiments, replication engines may be arranged to track the last snapshot associated with the last replication job for a file system. For example, in some embodiments, a replication engine may be arranged to trigger the generation of a new snapshot prior to starting replication jobs. Also, in some embodiments, a replication engine may be arranged perform replication jobs based on existing snapshots. For example, in some embodiments, a replication engine may be configured to launch replication jobs every other snapshot, with the rules for generating snapshots being independent from the replication engine. Generally, in one or more of the various embodiments, replication engines may be arranged to execute one or more rules that define whether the replication engine should generate a new snapshot for each replication job or use existing snapshots. In some embodiments, such rules may be provided by snapshot policies, configuration files, user-input, built-in defaults, or the like, or combination thereof.

In one or more of the various embodiments, file system engines, such as, file system engine 322 may be arranged to update parent file system object meta-data (e.g., current update epoch or snapshot number) before a write operation is committed or otherwise consider stable. For example, if document object 520 is updated, the file system engine may be arranged to examine the epoch/snapshot information for directory 510, directory 506, and directory 504 before committing the update to document object 520. Accordingly, in this example, if document object 520 is updated, directory 510, directory 506 and directory 508 may be associated the current epoch (5) before the write to document object 520 is committed (which will also associate document object 520 with epoch 5) since the update is occurring during the current epoch (epoch 5).

Figure 6:
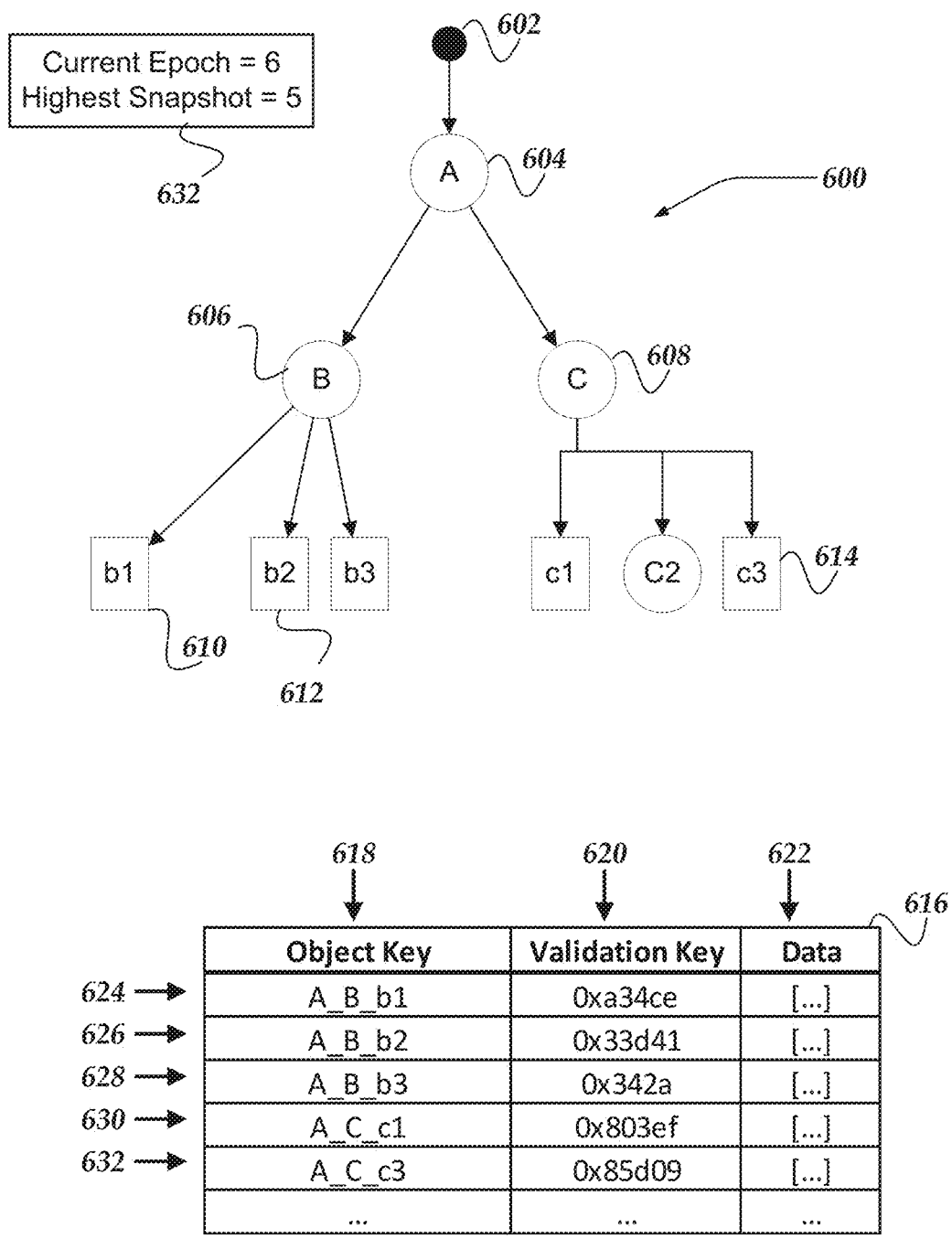
FIG. 6 illustrates a logical schematic of a file system arranged for replicating files in distributed file systems using object-based data storage in accordance with one or more of the various embodiments.

FIG. 6 illustrates a logical schematic of a file system arranged for replicating files in distributed file systems using object-based data storage in accordance with one or more of the various embodiments. In this example, file system 600 may be considered the source file system. In this example, file system 600 starts at root 602 and includes various file system objects, including, directory 604, directory 606, directory 608, document object 610, document object 612, document object 614, and so on. Likewise, for this example, object store 616 may be considered a target object store that may be configured to receive document objects from file system 600. In this example, object store 616 is represented as table that includes object key column 618, validation key column 620, and data column 622. In this example, records of the table representing object store 616, such as, record

624, record 626, record 628, record 630, record 632, or the like, represent object store objects that may correspond to document objects that have been copied from file system 600 to object store 616.

Similar to FIG. 5, circles in FIG. 6 represent directory objects (file system objects that have children) and rectangles in FIG. 6 represent document objects that are files, documents, or the like. In this example, the name of each file system object is indicated by the value in the center of each file system object. For example, directory object 606 may be considered to "directory B". One of ordinary skill in the art will appreciate that in production environments, file systems may support various names or naming schemes of file system objects rather than being limited to the abbreviated examples included here.

In one or more of the various embodiments, replication engines may be arranged to replication document objects to object stores. Accordingly, in some embodiments, a replication relationship that defines one or more portions of the file system to replication on the object store may be declared. In some embodiments, replication jobs may be associated with replication relationships. In other cases, for some embodiments, users may manually select one or more portions of the file system to replicate to the object store. For brevity and clarity, the one or more actions that may performed to replicate one or more portions of file systems to object stores may be referred to as replication job.

In this example, a replication job may include a replication relationship that declares that files (document objects) from a portion of the file system that started as root 602 may be replicated on object store 616.

Accordingly, in this example, replication engines may be arranged to traverse file system 600 starting at root 602. Thus, in this example: record 624, record 626, record 628 represent object store objects that correspond to document objects in directory object 606 (B); record 630 and record 632 represent object store objects that correspond to document objects in directory object 608; or the like. Note, in some embodiments, file system objects other than document objects may be omitted object store 616.

Also, in this example, as illustrated by the records in object store 616, each object store object may be associated with an object key. In this example, for some embodiments, the replication engine generated object keys that embedded file system information. In this example, the file system path information associated with each replication document object may be embedded in the object keys. Accordingly, in some embodiments, object store objects that replicate document objects in object stores may be correlated with the source document objects in file systems.

Further, in this example, validation key column 620 stores validation keys for that may include checksum information that may be employed to validate if the content in the corresponding object store object is unmodified since it has been replicated on the object store.

Generalized Operations

FIGS. 7-10 represent generalized operations for replicating files in distributed file systems using object-based data storage in accordance with one or more of the various embodiments. In one or more of the various embodiments, processes 700, 800, 900, and 1000 described in conjunction with FIGS. 7-10 may be implemented by or executed by one or more processors on a single network computer, such as network computer 300 of FIG. 3. In other embodiments, these processes, or portions thereof, may be implemented by or executed on a plurality of network computers, such as network computer 300 of FIG. 3. In yet other embodiments, these processes, or portions thereof, may be implemented by or executed on one or more virtualized computers, such as, those in a cloud-based environment. However, embodiments are not so limited and various combinations of network computers, client computers, or the like may be utilized. Further, in one or more of the various embodiments, the processes described in conjunction with FIGS. 7-10 may perform actions for managing cluster to cluster replication for distributed file systems in accordance with at least one of the various embodiments or architectures such as those described in conjunction with FIGS. 4-6. Further, in one or more of the various embodiments, some or all of the actions performed by processes 700, 800, 900, and 1000 may be executed in part by file system engine 322, or replication engine 324.

Figure 7:
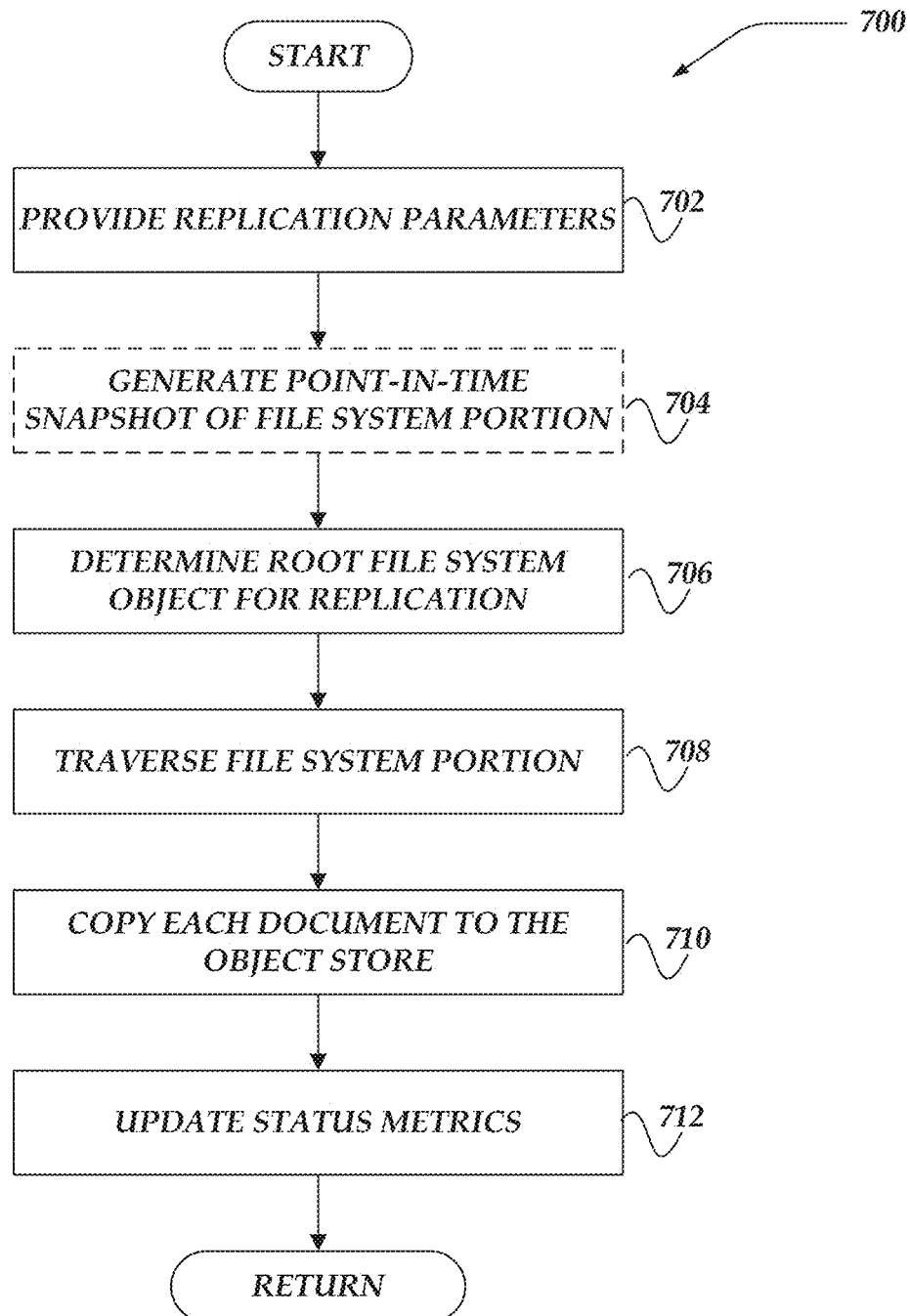
FIG. 7 illustrates an overview flowchart for a process for replicating files in distributed file systems using object-based data storage in accordance with one or more of the various embodiments.

FIG. 7 illustrates an overview flowchart for process 700 for replicating files in distributed file systems using object-based data storage in accordance with one or more of the various embodiments. After a start block, at block 702, in one or more of the various embodiments, replication parameters may be provided to a replication engine. In one or more of the various embodiments, replication parameters may be associated with replication relationship configuration that associates a file system with an object store. Also, in some embodiments, replication parameters may be provided by other configuration information including user input.

In one or more of the various embodiments, replication parameters may include information that enables replication engines to determine the file system portions that may be copied to an object store. Also, in some embodiments, replication parameters may include object store credentials, object store API parameters, or the like, that may be required for copying document objects to object stores.

For example, replication parameters may include, file system path identifying a portion of the file system, object store user credentials, object store location information, retry rules, scheduling information, or the like.

At block 704, in one or more of the various embodiments, optionally, replication engines may be arranged to generate a point-in-time snapshot of one or more portions of the file system. In some embodiments, replication engines may be arranged to generate a point-in-time snapshot before starting a replication job. Note, FIGS. 5 and 6 disclose a method of creating or using snapshots. But one of ordinary skill in the art will appreciate that other mechanisms may be employed to generate information that may be used to determine the current point-in-time content of the file system. For example, some file systems may employ backups, mirrors, tarballs, version control systems, or the like, to establish a point-in-time version of the content intended to be copied to the object store.

In one or more of the various embodiments, a replication job may be directed to a snapshot that was generated previously. Accordingly, in some embodiments, replication engines may be arranged to determine the snapshot information for determining which documents to copy to the object store from previously generated snapshots.

Note, in some embodiments, this block may be optional because the point-in-time snapshot of the file system may be already available.

At block 706, in one or more of the various embodiments, replication engines may be arranged to determine a root file system object the portions of the file system being replicated onto an object store. In one or more of the various embodiments, replication engines may be arranged to determine the top of the file system based on the replication parameters. For example, in some embodiments, replication parameters may declare a file system path that indicates the root of the portion of the file system that should be considered for replicating.

At block 708, in one or more of the various embodiments, replication engines may be arranged to traverse the file system portions to determine one or more document objects to copy to an object store. In one or more of the various embodiments, replication engines may be arranged to visit the one or more file system objects in the file system to identify the document objects that may be copied to the object store.

At block 710, in one or more of the various embodiments, replication engines may be arranged to copy each document object to the object store. In one or more of the various embodiments, replication engines may be arranged to copy one or more document objects that may be discovered during the traversal of the file system to the object store.

In one or more of the various embodiments, replication engines may be arranged to employ parallel operations to enable more than one document object to be copied at the same time. For example, in some embodiments, as described above file systems may be comprised of one or more multi-processor network computers. Accordingly, in some embodiments, one or more network computers that may comprise the file system may each be executing one or more portions of the replication job at the same time. Thus, in some embodiments, two or more document objects may be copied from the file system to the object store at the same time.

At block 712, in one or more of the various embodiments, replication engines may be arranged to update status metrics associated with the replication job. In one or more of the various embodiments, replication engines may be arranged to employ directory level meta-data or aggregate metrics to provide rapid or accurate estimates of the number of document objects that have been copied to the object store as well as the size associated with the remaining document objects. Accordingly, in some embodiments, this information may be employed to generate user interfaces that may report the ongoing status of the replication job.

Next, in one or more of the various embodiments, control may be returned to a calling process.

Figure 8:
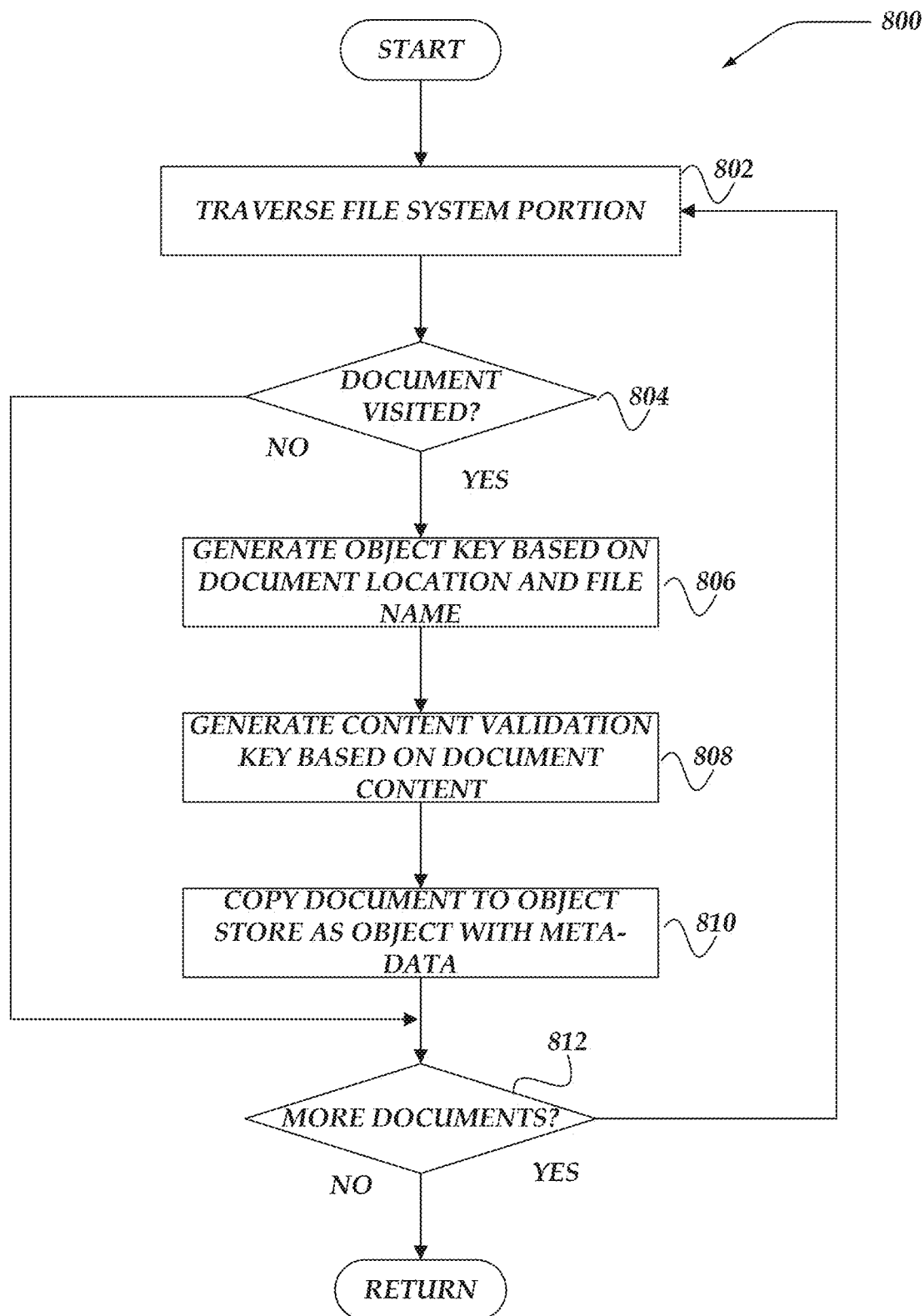
FIG. 8 illustrates a flowchart for a process for replicating files in distributed file systems using object-based data storage in accordance with one or more of the various embodiments.

FIG. 8 illustrates a flowchart for process 800 for replicating files in distributed file systems using object-based data storage in accordance with one or more of the various embodiments. After a start block, at block 802, in one or more of the various embodiments, replication engines may be arranged to traverse the file system portions being replicated to the object store. As described above, replication jobs may be directed to one or more portions of a file system. Accordingly, in some embodiments, replication engines may be arranged to begin traversing the file system portions that may be associated with the current replication job. In one or more of the various embodiments, replication engines may be arranged to employ one or more supporting data structures or indexes that may be associated with the one or more file system portions to affect the traversal rather than expressly visiting each file system object in the file system.

At decision block 804, in one or more of the various embodiments, if the traversal visits a document object, control may flow to block 806; otherwise, control may flow to decision block 812.

As described above, file systems may include a variety of different types of file system objects, such as, directories, links, files, meta-data, or the like. In some embodiments, replication engines may be arranged to copy document objects to object stores rather mirroring the file system. Accordingly, in some embodiments, replication engines may be arranged to copy document objects to object stores while omitting other types of file system objects. For example, in some embodiments, directories (e.g., folders) may be file system objects, however, they may be omitted from replicating to object stores.

At block 806, in one or more of the various embodiments, replication engines may be arranged to generate an object key for the document object based on the path of the document object in the file system.

In some embodiments, object keys may be employed to reference, identify, or access objects stored in object stores. Accordingly, in some embodiments, each document object that may be replicated on an object store may require a corresponding object key.

In one or more of the various embodiments, replication engines may be arranged to generate object keys that is based on information in the file system that uniquely identifies or references to the document object. In one or more of the various embodiments, generating the object key based on this information enables unique object keys to be employed to index document object on the object store.

In one or more of the various embodiments, replication engines may be arranged to determine a file path for the document object based on the file system. In some embodiments, the file path may comprise references or identifiers (e.g., names) of each ancestor directory object associated with the document object.

In some embodiments, replication engines may be arranged to determine file paths from a root file system object that is associated with the replication job down to the directory where the document object is located.

Also, in some embodiments, the file path may include the name of the document object. Or, in some embodiments, the name of the document object may be considered separate from the file path.

In one or more of the various embodiments, if the file path to the document object may be determined, the replication engine may be arranged to parse the file path or otherwise determine the components or the file path from the file system. Accordingly, in some embodiments, the determined components (e.g., directory names of ancestor directory objects) may be reassembled into an object key based on the one or more templates or rules as described above.

In cases where the file path does not include the document object name, in some embodiments, replication engines may be arranged to include the file name into the object key based on the object key template or assembly rules.

Further, in some embodiments, additional components, such as, prefixes, or the like, may be included in the object key.

In one or more of the various embodiments, in some cases, object stores may not support hierarchical relationships. For example, often objects in object stores may be stored in buckets, volumes, or the like, that may be considered bags of objects rather than enabling objects to be organized using hierarchical directory, folders, or the like. Accordingly, in some embodiments, replication engines may be arranged to embed the file system path information corresponding to document objects in the object keys used for document objects.

Also, in some embodiments, replication engines may be arranged to enable organizations or users to declare one or more prefix strings that may be prepended to object keys. Likewise, in some embodiments, replication engines may be arranged to enable organizations or users to declare one or more suffix strings that may be appended to object keys.

In some embodiments, replication engines may be arranged to determine fields, values, or the like, that may be combined into object keys based on rules, templates, or the like, that may be provided by configuration information to account for local requirements or local circumstances. For example, for some embodiments, replication engines may employ a template such as $CLUSTER_NAME_$PATH_STRING_$FILE_NAME, or the like, such that $CLUSTER_NAME, $PATH_STRING, $FILE_NAME may indicate variable values that may be included in an object key based on the document object being copied. For example, in some embodiments, a replication engine may be arranged to determine that a document object associated with a file system path of /business/payroll/2021/payroll_20210101.xls should be copies to an object store. Accordingly, in this example, the replication engine may be arranged to generate an object key such as CLUSTER1_business_payroll_2021_payroll_20210101_xls, or the like.

In one or more of the various embodiments, specifications or requirements associated with object keys may vary among different object store platforms. Accordingly, in some embodiments, replication engines may be arranged to enable different object key templates or object key rules that may enable support for different object key requirements or formats. In one or more of the various embodiments, replication engines may be arranged to employ one or more maps or mapping functions that enable incompatible file system path components to be replace with values that may be compatible object key requirements of a given object store platform. For example, if a file system uses UTF-16 for representing characters in strings, but the object store requires UTF-8, the replication engines may be arranged to perform the conversion.

Likewise, for some embodiments, if the file system has file system paths or file names that would exceed an object key size limit imposed by the object store platform, replication engines may be arranged to abort pending replication jobs. Alternatively, in some embodiments, replication engines may be arranged to employ hashing, map files, indexes, or the like, to generate alternate object key values that may conform to requirements or limitations of the object store. Accordingly, in some embodiments, object keys of objects in the object store may be correlated with file system path information corresponding to the document object in the file system.

At block 808, in one or more of the various embodiments, replication engines may be arranged to generate a content validation key based on the document content.

In one or more of the various embodiments, validation keys may be employed validate if the content of a document object matches the content of an object store object that corresponds to a document object.

In one or more of the various embodiments, replication engines may be arranged to employ one or more checksum functions, or the like, to generate a digital signature or digital fingerprint of the document object that may be based on the content of the document object being copied. In some embodiments, organizations or users may have different requirements regarding one or more features of the checksum operation, such as, performance, collision likelihood, checksum size, or the like. In some embodiments, replication engines may be arranged to determine a particular checksum function from configuration information to account for local requirements or local circumstances.

Accordingly, in some embodiments, replication engines may be arranged to include one or more values, such as, checksum value in the validation key.

At block 810, in one or more of the various embodiments, replication engines may be arranged to copy the document to the object store as an object with meta-data.

In one or more of the various embodiments, replication engines may be arranged to employ one or more object store platform APIs to store the document object with the checksum value on the object store. In some embodiments, the API parameters, communication protocols, or the like, may vary among different object store platforms. Accordingly, in some embodiments, replication engines may be arranged to support various object store platform APIs using one or more rules, libraries, parameter values, or the like, that may be provided via configuration information to account for variation among different object store platforms. For example, object store platform A may provide a native library a replication engine may employ directly to call API functions that store the document object and checksum using the generated object key. Also, for example, object store platform B may provide a REST API that may be used by HTTP or HTTPS requiring the replication engine include one or more custom HTTP headers as required by object store platform B. Also, in some cases, one or more object store platform may support or provide two or more APIs. Accordingly, in some embodiments, one or more the available APIs may be more advantageous than others depending local requirements or local circumstances. Thus, in some embodiments, replication engine may be arranged to determine the particular API/parameters of the object store based on configuration information.

Accordingly, in some embodiments, replication engines may provide the object key, the checksum value, and the document object content to object store. In some embodiments, object store platform may support an explicit meta-data protocol or API to enable the checksum value to be associated with the document objects that are stored on the object store. For example, for some embodiments, an object store platform API may enable callers (e.g., replication engines) to provide the checksum key as a parameter value that may be associated with the object on the object store.

In one or more of the various embodiments, if the object store platform does not provide native support for associating meta-data with objects, the replication engines may be arranged to include the checksum value as part of the document object content. For example, replication engines may be arranged to prepend the checksum key to a document object content such that it may be recovered or removed if the object is accessed from the object store. Also, in some embodiments, replication engines may be arranged to embed the checksum key as part of the object key.

In one or more of the various embodiments, as described above, distributed file systems may be comprised of a cluster of individual computers that each may be responsible for different portions of the file system. Accordingly, in some embodiments, replication engines may be arranged to employ parallel operations to improve performance by reducing the time it may take to copy eligible documents the object store.

Accordingly, in some embodiments, object keys may in part enable the performance improving parallel operations because they provide a unique identifier for each object store object that enables documents to be copied to the object store out-of-order while preserving the file system path information for each copied document absent a hierarchical structure being maintained on the object store. Thus, in some embodiments, replication engines may be arranged to copy two or more document objects to the object store in parallel such that the two or more documents object may be copied at the same time or the two or more document objects may be copied in an order that may be independent of their location in the file system.

At decision block 812, in one or more of the various embodiments, if there may be more documents to copy, control may loop back to block 802.

In one or more of the various embodiments, replication engines may be arranged to continue traversing the file system to identify one or more document objects to copy until the entire portion of the file system have been traversed. Alternatively, in some embodiments, the replication job may include one or more parameters define one or more conditions that may trigger the traversal of the file system to terminate before the entire portion of the file system has been visited. For example, for some embodiments, a replication job may include one or more parameter values that may limit the traversal to a declared depth. Likewise, for example, one or more replication parameter value may exclude one or more directories, document objects, or the like, from being copied to the object store.

Next, in one or more of the various embodiments, control may be returned to a calling process.

Figure 9:
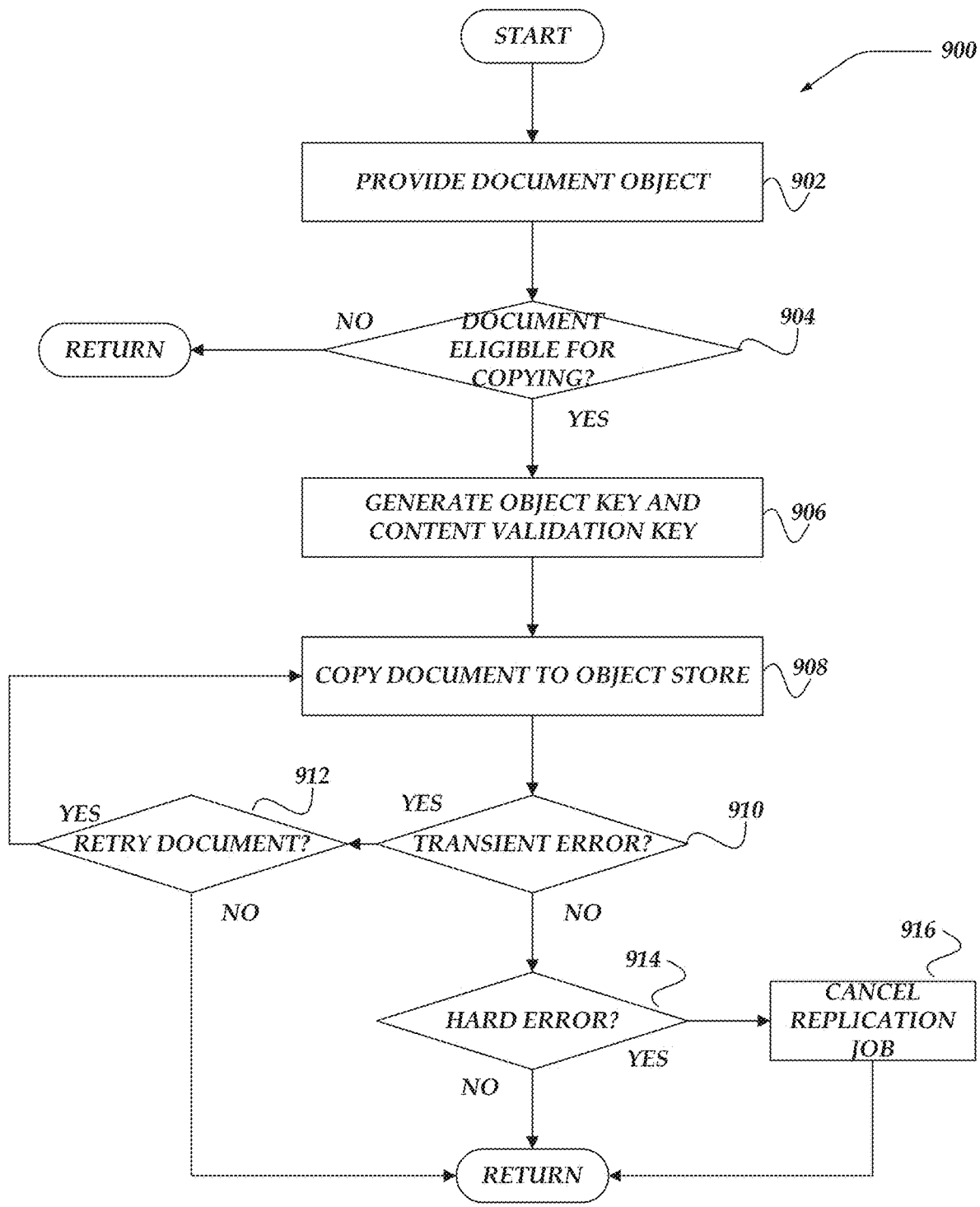
FIG. 9 illustrates a flowchart for a process for replicating files in distributed file systems using object-based data storage in accordance with one or more of the various embodiments.

FIG. 9 illustrates a flowchart for process 900 for replicating files in distributed file systems using object-based data storage in accordance with one or more of the various embodiments. After a start block, at block 902, in one or more of the various embodiments, a document to copy to the object store may be provided. As described above, replication engines may be arranged to traverse one or more portions of the file system to determine one or more document objects to copying to an object store.

At decision block 904, in one or more of the various embodiments, if the document object is eligible for copying to the object store, control may flow to block 906; otherwise, control may be returned to a calling process. In one or more of the various embodiments, replication engines (or file system engines) may be arranged to generate a snapshot to determine if document objects may be eligible for copying to the object store.

For example, in some embodiments, replication engines may be arranged to generate a replication snapshot that represents a snapshot of the file system that should be copied to the object store. Accordingly, in some embodiments, replication engines may be arranged to determine eligibility for copying based on snapshot membership. Thus, in some embodiments, if the document object is absent from older replication snapshots or if it has changed since it was last replicated to the object store, the document object may be deemed eligible for copying to the object store.

Also, in some embodiments, file system engines or replication engines may be arranged to apply one or more other criteria or filters for determining if a document object may be eligible for copying to object stores. For example, in some embodiments, a filter that excludes one or more sensitive files being copied to the object store may be applied to exclude one or more document objects.

In one or more of the various embodiments, replication engines or file system engines may be arranged to employ rules, filters, instructions, or the like, provided via configuration information to determine document object eligibility to account for local circumstances or local requirements.

At block 906, in one or more of the various embodiments, replication engines may be arranged to generate an object key and validation key for the document object.

As described above, in one or more of the various embodiments, replication engines may be arranged to generate object keys that is based on information in the file system that uniquely identifies or references to the document object. In one or more of the various embodiments, generating the object key based on this information enables unique object keys to be employed to index document object on the object store.

Also, as described above, in some embodiments, the replication engines may be arranged to generate a content validation key that corresponds to the document object. In one or more of the various embodiments, replication engines or file system engines may be arranged to employ validation keys to determine if the document object content is same as an object store object corresponding to the document object.

In one or more of the various embodiments, replication engines may be arranged to generate validation keys using a process that provides the same valued validation key for the same content. Thus, in some embodiments, if a document object and an object store object represent that version of a file, the validation key generated for the document object will match the validation key that is associated with the object store object.

In some embodiments, replication engines or file system engines may be arranged to employ the validation key to ensure that the content of an object store object corresponding to a document object has not been altered or otherwise changed since the validation key was created.

At block 908, in one or more of the various embodiments, replication engines may be arranged to copy the documents and its meta-data to the object store.

As described above, the replication engines may be arranged to perform one or more actions to copy the document object to the object store where it may be stored as an object store object the corresponds to the object key and is associated with meta-data that includes the validation key.

At decision block 910, in one or more of the various embodiments, if there may be a transient error, control may flow to decision block 912; otherwise, control may flow to decision block 914.

In one or more of the various embodiments, object stores may generate one or more errors as document objects may be copied or converted into object store objects. In some cases, the errors may be related to expected or unexpected temporary disruptions or delays. For some embodiments, these types of errors may be considered transient in that the conditions that may trigger the error may be expected to be short-term or otherwise self-correcting such that retrying the copy operation may be merited. For example, in some embodiments, errors related to issues, such as, network connection problems, delays/timeouts, or the like, may be considered transient because the object store may recover from the error or the conditions associated with the transient error may automatically go away.

In one or more of the various embodiments, error messages may be associated with various attributes or features, such as, error codes, error numbers, response codes, labels, descriptions, severity scores, priority scores, or the like. Accordingly, in some embodiments, replication engines may be arranged to employ these types of attributes to determine if an error may be a transient error. Thus, in some embodiments, replication engines may be arranged to employ maps, dictionary, patterns, rules, instructions, or the like, provided via configuration information to determine if an error message may be associated with a transient error.

At decision block 912, in one or more of the various embodiments, if the copying the document may be retried, control may flow to block 908; otherwise, control may be returned to a calling process.

In one or more of the various embodiments, replication engines may be arranged to retry the copying of the document object that may be disrupted by transient errors. However, in some embodiments, replication engines may be arranged to maintain a count of the number of transient errors that may occur for a single document object or a replication job. Accordingly, in some embodiments, if the error counts exceed one or more threshold values, replication engines may be arranged to additional actions, including canceling copying of the document object or canceling or pausing the replication job.

Also, in some embodiments, values representing the counts of observed transient errors may be maintained separately for different types of transient errors, or the like.

At decision block 914, in one or more of the various embodiments, if a hard error occurs, control may flow to block 916; otherwise, control may be returned to a calling process.

In one or more of the various embodiments, one or more error messages associated with copying the document object to the object store may be considered hard errors (non-transient errors) such that encountering such errors requires the replication job to be paused, suspended, or canceled.

In one or more of the various embodiments, hard errors may include variety of errors associated with copying document object to the object store. In one or more of the various embodiments, hard errors may be errors that may be considered errors that may not benefit from automatic retries. Likewise, in some embodiments, one or more hard errors may be considered too important or otherwise too noteworthy to continue the replication job.

Similar to transient errors, in one or more of the various embodiments, error messages may be associated with various attributes or features, such as, error codes, error numbers, response codes, labels, descriptions, severity scores, priority scores, or the like. Accordingly, in some embodiments, replication engines may be arranged to employ these attributes to determine if an error may be a hard error. Thus, in some embodiments, replication engines may be arranged to employ maps, dictionary, patterns, rules, instructions, or the like, provided via configuration information to determine if an error message may be associated with a hard error.

At block 916, in one or more of the various embodiments, replication engines may be arranged to cancel the pending replication job.

In one or more of the various embodiments, replication engines may be arranged to cancel, pause, or suspend replication jobs that generate hard errors. In some embodiments, replication engines may be arranged to generate one or more notification or reports that may be attention to the errors that result in the canceling or copying of the document object or canceling the replication job.

Next, in one or more of the various embodiments, control may be returned to a calling process.

Figure 10:
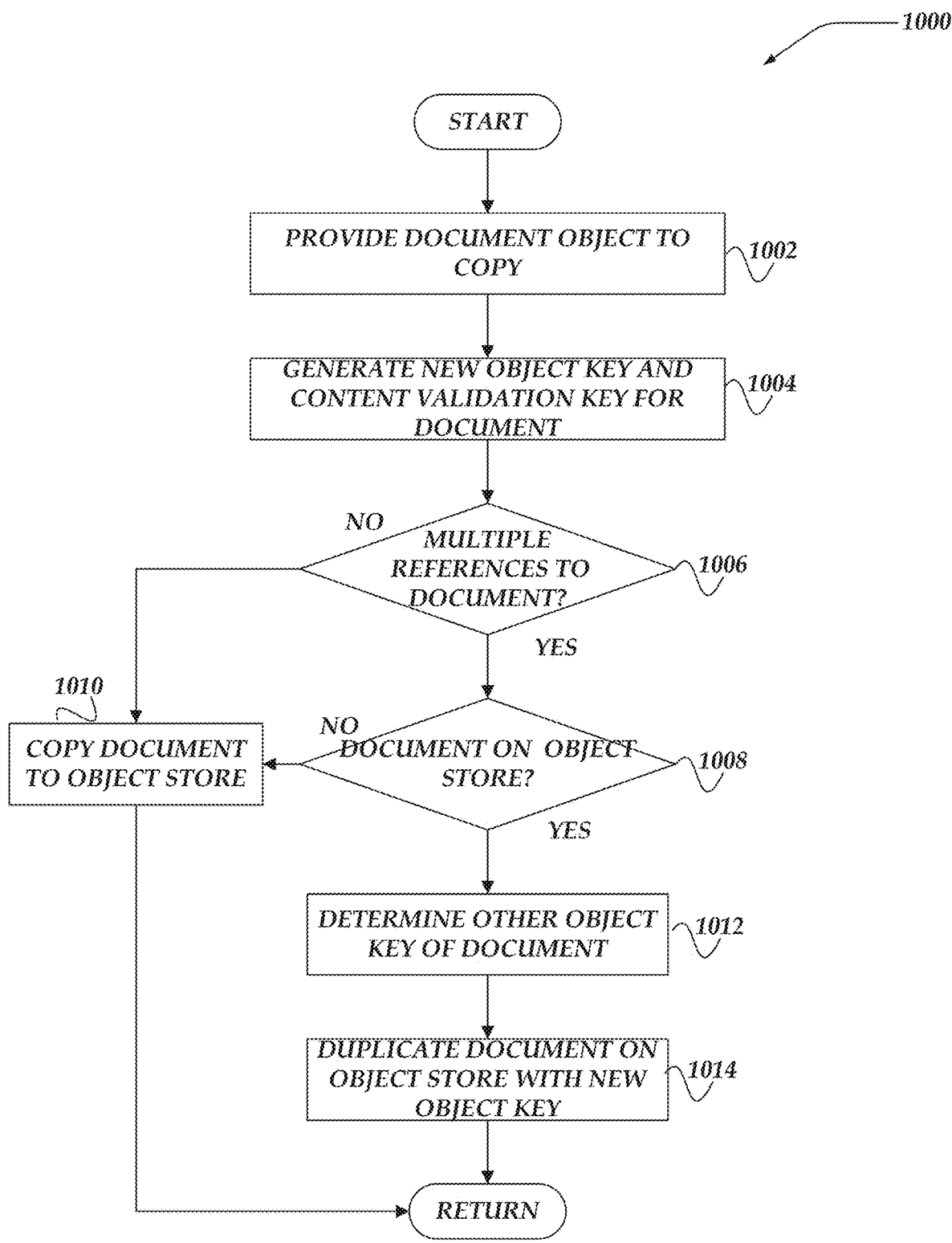
FIG. 10 illustrates a flowchart for a process for replicating files in distributed file systems using object-based data storage in accordance with one or more of the various embodiments.

FIG. 10 illustrates a flowchart for process 1000 for replicating files in distributed file systems using object-based data storage in accordance with one or more of the various embodiments. After a start block, at block 1002, in one or more of the various embodiments, a document object to copy to the object store may be provided. As described above, in some embodiments, replication engines may be arranged to traverse one or more portion of the file system to determine the document objects to copy to the object store.

At block 1004, in one or more of the various embodiments, replication engines may be arranged to generate a new object key and content validation key for the document. As described above, in some embodiments, replication engines may be arranged to generate object keys and content validation keys for document object being copied to the object store.

At decision block 1006, in one or more of the various embodiments, if multiple references to the document may exist on the file system, control may flow to decision block 1008; otherwise, control may flow to block 1010.

In one or more of the various embodiments, some file systems may support referencing the same file content using different file names. Some file systems may refer to such references as hard links. In some embodiments, the hard links may be user generated or otherwise known/visible to the user. However, in some embodiments, for some file systems, the hard links may be unknown or otherwise hidden from the user.

At decision block 1008, in one or more of the various embodiments, if the pending document may be already on the object store, control may flow to block 1012; otherwise, control may flow to block 1010.

In one or more of the various embodiments, replication engines may be arranged to determine if the file content associated with a hard link document object may already be copied to the object store. In some embodiments, replication engines may be arranged to track which portions of the file system have been copied to the object store to determine if file content is associated with another hard link that has already been copied to the object store.

Also, in some embodiments, replication engines may be arranged employ object keys to query object stores to determine if a document object associated with a hard link has been previously copied to the object store.

At block 1010, in one or more of the various embodiments, replication engines may be arranged to copy the document and its meta-data to the object store.

In one or more of the various embodiments, if the content associated with the multiple links (hard links) to the document object has not been copied to the object store, the replication engines may copy to document object to the object store as usual.

At block 1012, in one or more of the various embodiments, replication engines may be arranged to determine the object key that corresponds to the other copy of the document that may be stored on the object store.

In one or more of the various embodiments, replication engines may be arranged to generate or recreate the object key that may be associated with the one or more other references to the document object content. Accordingly, in some embodiments, replication engines may be arranged to employ this object key to confirm that other document objects associated with the current document object may already be copied to the object store.

At block 1014, in one or more of the various embodiments, replication engines may be arranged to enable the object store to duplicate the document on the object store and associate it the new object key.

In one or more of the various embodiments, object stores may not support multiple references or hard links. Accordingly, in some embodiments, replication engines may be arranged to enable the object store to duplicate the content of the other document object associated with the reference or hard link and assign it the new object key that correspond to the file path to the hard link being considered. Thus, in some embodiments, replication engines may be arranged to avoid copying data that may have been previously copied to the object store.

Next, in one or more of the various embodiments, control may be returned to a calling process.

It will be understood that each block in each flowchart illustration, and combinations of blocks in each flowchart illustration, can be implemented by computer program instructions. These program instructions may be provided to a processor to produce a machine, such that the instructions, which execute on the processor, create means for implementing the actions specified in each flowchart block or blocks. The computer program instructions may be executed by a processor to cause a series of operational steps to be performed by the processor to produce a computer-implemented process such that the instructions, which execute on the processor, provide steps for implementing the actions specified in each flowchart block or blocks. The computer program instructions may also cause at least some of the operational steps shown in the blocks of each flowchart to be performed in parallel. Moreover, some of the steps may also be performed across more than one processor, such as might arise in a multi-processor computer system. In addition, one or more blocks or combinations of blocks in each flowchart illustration may also be performed concurrently with other blocks or combinations of blocks, or even in a different sequence than illustrated without departing from the scope or spirit of the invention.

Accordingly, each block in each flowchart illustration supports combinations of means for performing the specified actions, combinations of steps for performing the specified actions and program instruction means for performing the specified actions. It will also be understood that each block in each flowchart illustration, and combinations of blocks in each flowchart illustration, can be implemented by special purpose hardware-based systems, which perform the specified actions or steps, or combinations of special purpose hardware and computer instructions. The foregoing example should not be construed as limiting or exhaustive, but rather, an illustrative use case to show an implementation of at least one of the various embodiments of the invention.

Further, in one or more embodiments (not shown in the figures), the logic in the illustrative flowcharts may be executed using an embedded logic hardware device instead of a CPU, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. In one or more embodiments, a microcontroller may be arranged to directly execute its own embedded logic to perform actions and access its own internal memory and its own external Input and Output Interfaces (e.g., hardware pins or wireless transceivers) to perform actions, such as System on a Chip (SOC), or the like.

What is claimed as new and desired to be protected by Letters Patent of the United States is:

1. A method for managing data over a network using one or more processors that execute instructions to perform actions, comprising:
   providing a file system that includes a plurality of file system objects, wherein each file system object is associated with one or more hierarchical file paths in the file system;
   providing an object store that is associated with the file system based on a replication relationship that declares one or more portions of the file system to be copied to the object store;
   determining a root file system object that is a parent file system object of the one or more portions of the file system based on the file system, wherein a traversal at the root file system object is initiated for the one or more portions of the file system;
   determining one or more file system objects based on the traversal of the one or more portions of the file system; and
   in response to visiting a file system object that is a document object and included in the one or more portions of the file system, performing further actions, including:
      determining a hierarchical file path of the document object that corresponds to a location in the file system based on the one or more file system objects that are one or more ancestor file system objects of the document object;
      generating an object key for the document object that encodes the hierarchical file path, wherein one or more portions of the object key correspond to the one or more ancestor file system objects; and
      copying the document object and the object key to the object store, wherein the document object is stored in the object store as an object store object, and wherein the object store object is indexed using an unordered index based on the object key.

2. The method of claim 1, further comprising:
   generating a validation key based on content that is included in the document object, wherein the validation key includes a checksum value that corresponds to the content; and
   associating the validation key with the document object as meta-data that is stored on the object store with the object store object that corresponds to the document object.

3. The method of claim 1, further comprising:
   in response to visiting another file system object that is a link to another document object, performing further actions, including:
      employing the file system and the link to determine the other document object;
      generating another object key that encodes another hierarchical file path that corresponds to the other document object;
      determining another object store object in the object store based on the other object key; and
      duplicating the other object store object in the object store, wherein the duplicated object store object is associated with the object key.

4. The method of claim 1, wherein copying the document object and the object key to the object store further comprises:
   determining one or more storage containers in the object store, wherein the object store is located in one or more cloud computing environments, and wherein the one or more storage containers store one or more object store objects in one or more unordered collections; and
   generating the object store object that corresponds to the document object based on providing the document object to the object store, wherein the object store object is stored in the one or more storage containers.

5. The method of claim 1, wherein determining the one or more file system objects based on the traversal, further comprises:
    determining a previous replication snapshot based on meta data associated with the file system; and
    generating a replication snapshot on the file system that includes the one or more file system objects based on the replication snapshot and the previous replication snapshot, wherein the included one or more file system objects are associated with changes that are omitted from the previous replication snapshot, and wherein a remainder of file system objects of the plurality of file system objects are excluded from being copied to the object store.

6. The method of claim 1, wherein copying the document object and the object key to the object store further comprises:
    in response to an error message from the object store, performing further actions, including:
        determining a type of the error corresponding to the error message based on the error message and the object store;
        in response to the error message corresponding to a transient error, retry copying the document object and the object key to the object store; and
        in response to the error message corresponding to an irreparable error, aborting the traversal of the one or more portions of the file system.

7. The method of claim 1, wherein copying the document object and the object key to the object store, further comprises, copying two or more document objects to the object store in parallel, wherein the two or more documents object are copied at the same time or the two or more document objects are copied in an order that is independent of their location in the file system.

8. A network computer for managing data, comprising:
    a memory that stores at least instructions; and
    one or more processors that execute instructions that perform actions, including:
        providing a file system that includes a plurality of file system objects, wherein each file system object is associated with one or more hierarchical file paths in the file system;
        providing an object store that is associated with the file system based on a replication relationship that declares one or more portions of the file system to be copied to the object store;
        determining a root file system object that is a parent file system object of the one or more portions of the file system based on the file system, wherein a traversal at the root file system object is initiated for the one or more portions of the file system;
        determining one or more file system objects based on the traversal of the one or more portions of the file system; and
        in response to visiting a file system object that is a document object and included in the one or more portions of the file system, performing further actions, including:
            determining a hierarchical file path of the document object that corresponds to a location in the file system based on the one or more file system objects that are one or more ancestor file system objects of the document object;
            generating an object key for the document object that encodes the hierarchical file path, wherein one or more portions of the object key correspond to the one or more ancestor file system objects; and
            copying the document object and the object key to the object store, wherein the document object is stored in the object store as an object store object, and wherein the object store object is indexed using an unordered index based on the object key.

9. The network computer of claim 8, wherein the one or more processors execute instructions that perform actions, further comprising:
    generating a validation key based on content that is included in the document object, wherein the validation key includes a checksum value that corresponds to the content; and
    associating the validation key with the document object as meta-data that is stored on the object store with the object store object that corresponds to the document object.

10. The network computer of claim 8, further comprising:
    in response to visiting another file system object that is a link to another document object, performing further actions, including:
        employing the file system and the link to determine the other document object;
        generating another object key that encodes another hierarchical file path that corresponds to the other document object;
        determining another object store object in the object store based on the other object key; and
        duplicating the other object store object in the object store, wherein the duplicated object store object is associated with the object key.

11. The network computer of claim 8, wherein copying the document object and the object key to the object store further comprises:
    determining one or more storage containers in the object store, wherein the object store is located in one or more cloud computing environments, and wherein the one or more storage containers store one or more object store objects in one or more unordered collections; and
    generating the object store object that corresponds to the document object based on providing the document object to the object store, wherein the object store object is stored in the one or more storage containers.

12. The network computer of claim 8, wherein determining the one or more file system objects based on the traversal, further comprises:
    determining a previous replication snapshot based on meta data associated with the file system; and
    generating a replication snapshot on the file system that includes the one or more file system objects based on the replication snapshot and the previous replication snapshot, wherein the included one or more file system objects are associated with changes that are omitted from the previous replication snapshot, and wherein a remainder of file system objects of the plurality of file system objects are excluded from being copied to the object store.

13. The network computer of claim 8, wherein copying the document object and the object key to the object store further comprises:
    in response to an error message from the object store, performing further actions, including:
        determining a type of the error corresponding to the error message based on the error message and the object store;

in response to the error message corresponding to a transient error, retry copying the document object and the object key to the object store; and in response to the error message corresponding to an irreparable error, aborting the traversal of the one or more portions of the file system.

14. A processor readable non-transitory storage media that includes instructions for managing data over a network, wherein execution of the instructions by one or more processors on one or more network computers performs actions, comprising:

providing a file system that includes a plurality of file system objects, wherein each file system object is associated with one or more hierarchical file paths in the file system;

providing an object store that is associated with the file system based on a replication relationship that declares one or more portions of the file system to be copied to the object store;

determining a root file system object that is a parent file system object of the one or more portions of the file system based on the file system, wherein a traversal at the root file system object is initiated for the one or more portions of the file system;

determining one or more file system objects based on the traversal of the one or more portions of the file system; and in response to visiting a file system object that is a document object and included in the one or more portions of the file system, performing further actions, including:

determining a hierarchical file path of the document object that corresponds to a location in the file system based on the one or more file system objects that are one or more ancestor file system objects of the document object;

generating an object key for the document object that encodes the hierarchical file path, wherein one or more portions of the object key correspond to the one or more ancestor file system objects; and copying the document object and the object key to the object store, wherein the document object is stored in the object store as an object store object, and wherein the object store object is indexed using an unordered index based on the object key.

15. The media of claim 14, further comprising:
generating a validation key based on content that is included in the document object, wherein the validation key includes a checksum value that corresponds to the content; and
associating the validation key with the document object as meta-data that is stored on the object store with the object store object that corresponds to the document object.

16. The media of claim 14, further comprising:
in response to visiting another file system object that is a link to another document object, performing further actions, including:
employing the file system and the link to determine the other document object;
generating another object key that encodes another hierarchical file path that corresponds to the other document object;
determining another object store object in the object store based on the other object key; and duplicating the other object store object in the object store, wherein the duplicated object store object is associated with the object key.

17. The media of claim 14, wherein copying the document object and the object key to the object store further comprises:
determining one or more storage containers in the object store, wherein the object store is located in one or more cloud computing environments, and wherein the one or more storage containers store one or more object store objects in one or more unordered collections; and
generating the object store object that corresponds to the document object based on providing the document object to the object store, wherein the object store object is stored in the one or more storage containers.

18. The media of claim 14, wherein determining the one or more file system objects based on the traversal, further comprises:
determining a previous replication snapshot based on meta data associated with the file system; and
generating a replication snapshot on the file system that includes the one or more file system objects based on the replication snapshot and the previous replication snapshot, wherein the included one or more file system objects are associated with changes that are omitted from the previous replication snapshot, and wherein a remainder of file system objects of the plurality of file system objects are excluded from being copied to the object store.

19. The media of claim 14, wherein copying the document object and the object key to the object store further comprises:
in response to an error message from the object store, performing further actions, including:
determining a type of the error corresponding to the error message based on the error message and the object store;
in response to the error message corresponding to a transient error, retry copying the document object and the object key to the object store; and
in response to the error message corresponding to an irreparable error, aborting the traversal of the one or more portions of the file system.

20. A system for managing data comprising:
a network computer, comprising:
a memory that stores at least instructions; and
one or more processors that execute instructions that perform actions, including:
providing a file system that includes a plurality of file system objects, wherein each file system object is associated with one or more hierarchical file paths in the file system;
providing an object store that is associated with the file system based on a replication relationship that declares one or more portions of the file system to be copied to the object store;
determining a root file system object that is a parent file system object of the one or more portions of the file system based on the file system, wherein a traversal at the root file system object is initiated for the one or more portions of the file system;
determining one or more file system objects based on the traversal of the one or more portions of the file system; and in response to visiting a file system object that is a document object and included in the one or more portions of the file system, performing further actions, including:
  determining a hierarchical file path of the document object that corresponds to a location in the file system based on the one or more file system objects that are one or more ancestor file system objects of the document object;
  generating an object key for the document object that encodes the hierarchical file path, wherein one or more portions of the object key correspond to the one or more ancestor file system objects; and
  copying the document object and the object key to the object store, wherein the document object is stored in the object store as an object store object, and wherein the object store object is indexed using an unordered index based on the object key; and
a client computer, comprising:
a memory that stores at least instructions; and
one or more processors that execute instructions that perform actions, including, providing the replication relationships.

21. The system of claim 20, wherein the one or more network computer processors execute instructions that perform actions, further comprising:
  generating a validation key based on content that is included in the document object, wherein the validation key includes a checksum value that corresponds to the content; and
  associating the validation key with the document object as meta-data that is stored on the object store with the object store object that corresponds to the document object.

22. The system of claim 20, wherein the one or more network computer processors execute instructions that perform actions, further comprising:
  in response to visiting another file system object that is a link to another document object, performing further actions, including:
    employing the file system and the link to determine the other document object;
    generating another object key that encodes another hierarchical file path that corresponds to the other document object;
    determining another object store object in the object store based on the other object key; and
    duplicating the other object store object in the object store, wherein the duplicated object store object is associated with the object key.

23. The system of claim 20, wherein copying the document object and the object key to the object store further comprises:
  determining one or more storage containers in the object store, wherein the object store is located in one or more cloud computing environments, and wherein the one or more storage containers store one or more object store objects in one or more unordered collections; and
  generating the object store object that corresponds to the document object based on providing the document object to the object store, wherein the object store object is stored in the one or more storage containers.

24. The system of claim 20, wherein determining the one or more file system objects based on the traversal, further comprises:
  determining a previous replication snapshot based on meta data associated with the file system; and
  generating a replication snapshot on the file system that includes the one or more file system objects based on the replication snapshot and the previous replication snapshot, wherein the included one or more file system objects are associated with changes that are omitted from the previous replication snapshot, and wherein a remainder of file system objects of the plurality of file system objects are excluded from being copied to the object store.

25. The system of claim 20, wherein copying the document object and the object key to the object store further comprises:
  in response to an error message from the object store, performing further actions, including:
    determining a type of the error corresponding to the error message based on the error message and the object store;
    in response to the error message corresponding to a transient error, retry copying the document object and the object key to the object store; and
    in response to the error message corresponding to an irreparable error, aborting the traversal of the one or more portions of the file system.

26. The system of claim 20, wherein copying the document object and the object key to the object store, further comprises, copying two or more document objects to the object store in parallel, wherein the two or more documents object are copied at the same time or the two or more document objects are copied in an order that is independent of their location in the file system.

* * * * *